US006176009B1

(12) United States Patent
Inman

(10) Patent No.: US 6,176,009 B1
(45) Date of Patent: Jan. 23, 2001

(54) PALLET MAKING APPARATUS AND METHOD

(76) Inventor: Robert W. Inman, 404 OUA 53, Louann, AR (US) 71751

( * ) Notice: Under 35 U.S.C. 154(b), the term of this patent shall be extended for 0 days.

(21) Appl. No.: 09/195,968

(22) Filed: Nov. 19, 1998

(51) Int. Cl.[7] .............................. B23P 19/00; B23P 21/00
(52) U.S. Cl. ................................ 29/772; 29/429; 29/783; 29/787; 29/798
(58) Field of Search .............................. 29/701, 714, 716, 29/772, 783, 787, 791, 795, 798, 429

(56) References Cited

U.S. PATENT DOCUMENTS

| | | | |
|---|---|---|---|
| 2,856,826 | 10/1958 | Norquist et al. . | |
| 3,557,439 | 1/1971 | Dykeman . | |
| 3,591,067 | 7/1971 | Vial . | |
| 3,706,408 | * 12/1972 | Burch . | |
| 3,755,871 | * 9/1973 | Nelson, Jr. . | |
| 3,763,547 | * 10/1973 | Blakeslee . | |
| 3,945,549 | * 3/1976 | Colson . | |
| 3,968,560 | 7/1976 | Vial . | |
| 4,039,112 | 8/1977 | Schultz . | |
| 4,168,566 | 9/1979 | Streckert . | |
| 4,204,624 | 5/1980 | Gunn et al. . | |
| 4,394,952 | 7/1983 | Crane . | |
| 4,403,388 | 9/1983 | Belcher . | |
| 4,467,951 | 8/1984 | Pagano . | |
| 4,478,361 | 10/1984 | McElhannon . | |
| 4,489,874 | 12/1984 | Worst et al. . | |
| 4,793,540 | * 12/1988 | Mangan et al. . | |
| 4,967,948 | 11/1990 | Allspaw . | |
| 5,095,605 | * 3/1992 | Tonus .................................... | 29/798 |
| 5,584,951 | 12/1996 | MacFarland . | |

* cited by examiner

*Primary Examiner*—S. Thomas Hughes
*Assistant Examiner*—Eric Compton

(57) ABSTRACT

A pallet assembly apparatus provides a conveyor having a plurality of carriers attached thereto. The conveyor moves the carriers along an assembly path in a downstream direction. As each carrier moves along the assembly path in the downstream direction, it passes first slat hopper, a set of stringer hoppers, a second slat hopper and then a nailer. Detents of the carriers pull the necessary bottom slats, stringers, and top slats as needed to assemble the pallet. The nailer fastens the slats to the stringers. Once the carrier moves past the nailer, the detents move to a resting position in which they are removed from the assembled pallet and the pallet is removed from the pallet assembly apparatus.

24 Claims, 13 Drawing Sheets

PALLET MAKING APPARATUS AND METHOD

BACKGROUND OF THE INVENTION

1. Field of Invention

The present invention relates to the field of framed structure assembly. More specifically, the invention relates to a device and method for assembling wooden pallets including a jig, or carrier, that facilitates the assembly.

2. Related Art

Wooden pallets are widely used for transporting and storing goods. A pallet is constructed by nailing a series of slats to transversely positioned stringers. Typically pallets have slats nailed to the top and bottom of the stringers although they may have slats nailed only to the top. Pallets may come in different sizes; the number of stingers and slats used and the size of the material used to make the pallets may vary, providing variety in the possible sizes for pallets.

Fabrication, or assembly, of pallets is sometimes done by hand. However, automatic, or semi-automatic, fabrication is more economical for large-scale pallet construction. A number of pallet assembly systems have been used. Many of the systems require manual positioning of the individual pallet components and many are capable of assembling/nailing only one side of pallet. Therefore, the pallet must be flipped during assembly to complete both sides of a double-sided pallet.

Another device that does provide for nailing of the top and bottom of a double-sided pallet and is shown in U.S. Pat. No. 4,403,388 uses a single slat hopper which requires that the pallet be moved back and forth beneath the single hopper to assemble a single pallet. Accordingly, the device may assemble only a single pallet at any one time, making the device relatively slow, and uses a relatively complicated jig, or carrier, that has trip-dogs that pull slats from the hopper as the jig moves past the hopper.

Thus, despite the use of the prior art features, there remains a need for a pallet assembly device and method that is relatively simple and that provides for relatively fast, high volume pallet assembly.

SUMMARY OF THE INVENTION

To achieve such improvements, the present invention provides an automatic pallet making apparatus for assembling pallets from slats and stringers. The apparatus provides a conveyor having at least one carrier attached thereto. The conveyor is adapted to move the carriers downstream along an assembly path defined by the conveyor. Positioned along the assembly path sequentially in the downstream direction are: (1) a first slat hopper, (2) at least two stringer hoppers, (3) a second slat hopper, and (4) at least one nailer. As the conveyor moves the carrier downstream along the assembly path, the carrier pulls a bottom layer of slats from the first slat hopper, then a set of stringers onto the bottom slats, and then a top layer of slats onto the stringers. The nailer then nails the slats to the stringers. To accomplish the withdrawal of the slats and stringers from the respective hoppers, the carrier provides a set of detents that are selectively moved into and out of position. In general, the respective detents are moved into position just before the respective hopper from which the detents are designed to draw material. However, when in position, the detents are necessarily positioned in the pallet abutting the components they pulled from the hoppers. Thus, after the pallet is nailed together, the detents are moved out of position to a resting position in which they are removed from the assembled pallet so that the assembled pallet may be removed from the carrier.

One aspect of the present invention provides an automatic pallet making apparatus for assembling pallets from slats and stringers. The apparatus provides a conveyor and at least one carrier attached to the conveyor. The conveyor is adapted to move the carrier along an assembly path in a downstream direction. A first slat hopper, positioned in the assembly path, is adapted to hold a plurality of slats. The carrier pulls a predetermined number of slats sequentially from the first slat hopper, one at a time, as the carrier moves downstream along the assembly path past the first slat hopper. As the carrier pulls the slats from the hopper it aligns the slats substantially in a single plane to form a bottom of the pallet. At least two stringer hoppers are positioned in the assembly path downstream from the first slat hopper. The stringer hoppers are each adapted to hold a plurality of stringers and are oriented substantially parallel to one another with the stringers aligned transversely to the slats in the first slat hopper and transversely to the slats forming the bottom of the pallet. The carrier pulls one of the stringers from each of the at least two stringer hoppers onto the bottom of the pallet as the carrier moves downstream along the assembly path past the stringer hopper with the stringers pulled from the stringer hoppers oriented transversely, and preferably perpendicular, to the slats of the bottom in spaced, substantially parallel relation to one another. A second slat hopper is positioned in the assembly path downstream from stringer hoppers and is adapted to hold a plurality of slats therein. As the carrier moves downstream along the assembly path and passes the second slat hopper, it pulls a predetermined number of slats sequentially from the second slat hopper, one at a time, onto the previously pulled stringers. The second slat hopper is oriented substantially parallel to the first slat hopper with the slats held in the first and second slat hoppers substantially parallel to one another and transversely oriented (and preferably perpendicular) to the stringers in the stringer hopper. The carrier aligns the slats pulled from the second slat hopper onto the stringers substantially in a single plane to form a top of the pallet with the slats forming the top oriented transversely, and preferably perpendicular, to the stringers and substantially parallel to the slats forming the bottom of the pallet. At least one nailer is positioned in the assembly path downstream from the second slat hopper and is adapted and positioned to nail the slats forming the top and bottom of the pallet to the stringers of the pallet.

In one preferred embodiment, the conveyor provides a conveyor frame, an endless conveyor belt movably attached to the conveyor frame, and a drive motor attached to and adapted to move the endless conveyor belt. The conveyor belt may alternatively comprise a chain, a belt, or any other form commonly used for conveyors.

One preferred embodiment for the carrier provides a base having a substantially flat upper surface, a front, a back, and opposing sides. A plurality of bottom slat detents are attached to the base and are spaced between the front and the back of the base. The plurality of bottom slat detents are selectively movable between a resting position, in which the plurality of bottom slat detents do not extend above the upper surface of the base, and an actuated position, in which the plurality of bottom slat detents do extend above the upper surface of the base. At least one stringer detent is also attached to the base at a position proximal the back of the base. The at least one stringer detent is likewise selectively movable between a resting position, in which the at least one stringer detent does not extend above the upper surface of the base in the vertical direction a distance that is at least slightly greater than the thickness of the slats, and an actuated position, in which the at least one stringer detent does extend above the upper surface of the base in the vertical direction a distance that is at least slightly greater than the thickness of the slats. Additionally, a plurality of top slat detents are attached to the base and are spaced between the front and the back of the base. The plurality of top slat detents are similarly selectively movable between a resting position, in which the plurality of top slat detents do not extend over the upper surface of the base, and an actuated position, in which the plurality of top slat detents do extend over the upper surface of the base in the vertical direction a distance that is at least slightly greater than the thickness of the slats and the stringers.

The apparatus provides, in alternative embodiments, carriers fixedly attached to the conveyor or removable attached thereto.

Preferably, top and bottom slat detents are adapted to be selectively, adjustably positioned between the front and the back of the base and the stringer detents are adapted to be selectively, adjustably positioned between the opposing sides of the base.

In one preferred embodiment of the carrier, or carrier apparatus, each of the bottom slat detents comprise a pivot pin having a pivot end and an apogee end. The pivot end of the pivot pin is pivotally mounted to the base. The pivot pin is pivotable between a resting position and an actuated position. The apogee end of the pivot pin defines a catch that is adapted to extend above the upper surface of the base when the pivot pin is in the actuated position. The catch defines a forward abutment surface adapted to abut a side of a bottom slat. Preferably, the pivot pin is removably mounted to the base and is adapted to be selectively, adjustably positioned between the front and the back of the base. One embodiment that facilitates this adjustable positioning uses a base that defines a plurality of threaded hinge bores spaced between the front and the back of the base and a threaded hinge pin, which pivotally mounts the pivot pin to the base, that is adapted to mate with the plurality of threaded hinge bores. The catch is a raised portion extending upward, perpendicular from the pivot pin when the pivot pin is in the actuated position in one preferred embodiment. In an alternative preferred embodiment, the pivot pin is arcuate along at least a portion of its length.

In another preferred embodiment of the carrier, each of the bottom slat detents comprise a solenoid having a selectively movable core that is movable between a resting position and an actuated position. The core has an upper end adapted and positioned to extend above the upper surface of base when the core is in the actuated position.

In yet another preferred embodiment of the carrier, each of the bottom slat detents comprise a gear assembly attached to the base that actuates a pivot pin attached thereto. The gear assembly uses a right angle gear mounted on a drive shaft. A first right angle pinion meshes with the right angle gear on one side of the right angle gear and mounted on a first shaft; and a second right angle pinion meshes with the right angle gear on an opposite side of the right angle gear from the first right angle pinion and mounted on a second shaft. The first and second shafts also have a first and second pinion mounted thereon respectively. The pinions are adapted to mate with a first and second rack, respectively, that is mounted on the conveyer and that rotates the right angle gear in opposite first and second directions. The second rack is mounted downstream from the first rack. The pivot end of the pivot pin is mounted to the drive shaft which turns the pivot pin along with the right angle gear. Thereby, the gear assembly is adapted to selectively move the pivot pin between the resting position and the actuated position.

In alternative preferred embodiments, the bottom slat detents are attached to the sides of the base or selectively extend through openings defined in the bottom of the base.

Preferably, the bottom slat detents are positioned in pairs which are aligned with one another between the front and the back of the base with one detent mounted on one side of the base and the other detent mounted on the opposite side of the base. The pairs of bottom slat detents are spaced between the front and the back of the base.

Additionally, the bottom slat detents define a plurality of bottom slat positions on the base in which a correctly positioned bottom slat rests during assembly of a pallet. The bottom slat positions are aligned substantially horizontally and substantially parallel to the front and the back of the base. In alternative embodiments, each one of the plurality of bottom slat positions on the base is defined by one of the bottom slat detents, sets of two bottom slat detents, or sets of at least three bottom slat detents.

Similarly, in one preferred embodiment of the carrier, or carrier apparatus, each of the stringer detents comprises a pivot pin having a pivot end and an apogee end with the pivot end of the pivot pin pivotally mounted to the base. The pivot pin is pivotable between a resting position and an actuated position; and the apogee end of the pivot pin defines a catch. The catch is adapted to extend above bottom slats resting on the upper surface of the base when the pivot pin is in the actuated position and defines a forward abutment surface adapted to abut a side of a stringer. To facilitate adjustability of the stringer detents, the pivot pin is preferably removably mounted to the base and is adapted to be selectively, adjustably positioned between the opposing sides of the base. The catch comprises a portion of the pivot pin proximal the apogee end.

In another preferred embodiment of the carrier, each of the stringer detents comprises a solenoid having a selectively movable core movable between a resting position and an actuated position. The core has an upper end that is adapted and positioned to extend above bottom slats resting on the upper surface of the base when the core is in the actuated position.

In yet another preferred embodiment of the carrier, each of the stringer detents comprise a gear assembly attached to the base that actuates a pivot pin attached thereto which operates the same as that previously described for use with the bottom slat detents.

In alternative preferred embodiments, the stringer detents are attached to the back of the base or selectively extend through openings defined in the bottom of the base.

Each of the stringer detents may define one stringer position or two or more stringer positions (The stringer positions are aligned substantially perpendicular to the front and the back of the base and substantially parallel to the sides of the base). Thus, the carrier may have one stringer detent or two or more stringer detents.

In one preferred embodiment of the carrier, or carrier apparatus, each of the top slat detents comprise at least two side flaps having a pivot end and an apogee end with the pivot end pivotally mounted to the base. The at least two side flaps are pivotable between a resting position and an actuated position. The apogee end of the at least two side flaps each defines at least one catch that is positioned and adapted to extend over the upper surface of the base when the at least two side flaps are in the actuated position and that defines a forward abutment surface adapted and positioned to abut a side of a top slat. Preferably, the catch is removably mounted to the associated one of the at least two side flaps and is adapted to be selectively, adjustably positioned between the front and the back of the base. One embodiment of the adjustably, positionable catches uses a plurality of threaded bores defined by the side flaps and spaced between the front and the back of the base and a threaded attachment pin adapted to mate with the plurality of threaded bores. The threaded attachment pin is adapted to mount the at least one catch to the at least two side flaps.

The catch is, generally, a side abutment extending laterally inward, perpendicular from the at least two side flaps toward the center of the base when the pivot pin is in the actuated position.

The carrier preferably has two side flaps with one mounted to each side of the base and each having a plurality of catches thereon. Each of the plurality of catches on one of the two side flaps corresponds to and is aligned with one of the plurality of catches on the other of the two side flaps to define a top slat position. The top slat positions are spaced between the front and the back of the base and are aligned substantially horizontally and substantially parallel to the front and the back of the base. The plurality of bottom slat detents preferably define a plurality of bottom slat positions on the base that are each aligned substantially vertically over one of the plurality of bottom slat positions.

To properly remove a slat from the second slat hopper the catches of the side flaps are spaced above the top surface of the base a distance at least slightly higher than the top of a stringer resting on a bottom slat resting on the base.

In another preferred embodiment of the carrier, each of the top slat detents comprise a gear assembly attached to the base that actuates a pivot pin attached thereto which operates the same as that previously described for use with the bottom slat detents.

In yet another preferred embodiment of the carrier, each of the top slat detents comprises a solenoid having a selectively movable core movable between a resting position and an actuated position. The core has an upper end that is adapted and positioned to extend above bottom slats resting on the upper surface of the base when the core is in the actuated position.

To actuate the previously described detents, one aspect of the assembly apparatus provides a set of detent tracks. A bottom slat detent track is attached to the conveyor and is adapted to move the plurality of bottom slat detents from the resting position to the actuated position and maintain the plurality of bottom slat detents in the actuated position from a position upstream from the first slat hopper to a position at or downstream from the at least one nailer. The bottom slat detent track is adapted to release the plurality of bottom slat detents from the actuated position to the resting position at or downstream from the at least one nailer.

Similarly, a stringer detent track is attached to the conveyor and is adapted to move the at least one stringer detent from the resting position to the actuated position and maintain the at least one stringer detent in the actuated position from a position between the first slat hopper and the stringer hopper to a position at or downstream from the at least one nailer. The bottom slat detent track is adapted to release the at least one stringer detent from the actuated position to the resting position at or downstream from the at least one nailer.

In addition, a first top slat detent track is attached to the conveyor and is adapted to move the plurality of top slat detents from the resting position to the actuated position and maintain the plurality of top slat detents in the actuated position from a position between the stringer hopper and the second slat hopper to a position at or downstream from the at least one nailer. The first top slat detent track is adapted to release the plurality of first top slat detents from the actuated position to the resting position at or downstream from the at least one nailer. To ensure that the side flaps of the top slat detents are removed from the assembled pallet before removal of the pallet from the assembly apparatus, the apparatus preferably also includes a second top slat detent track attached to the conveyor. The second top slat detent track is adapted to move the plurality of top slat detents from the actuated position to the resting position at or downstream from the at least one nailer.

In general, the first slat hopper, the stringer hopper, and the second slat hopper have similar construction; they merely have different shapes to accommodate the raw materials (i.e. slats or stringers) for which they are designed. Each of the hoppers, preferably comprises a hopper body which defines a cavity therein, a top, a bottom, an upstream front, a downstream back, and opposing sides. The cavity defines an opening at the top of the hopper body and is sized to hold a plurality of stacked slats or stringers therein. A bottom support of the hopper body is adapted to support the plurality of stacked slats or stringers vertically. The bottom of the hopper body defines a detent passageway extending the full width from the front to the back of the hopper body; the front of the hopper body defines a front opening adjacent the bottom of the hopper body that exposes at least a portion of the upstream side of the bottom one of the plurality of stacked slats or stringers held in the hopper body; and the back of the hopper body defines a back opening adjacent the bottom of the hopper body that is sized and adapted to permit the bottom one of the plurality of stacked slats or stringers held in the hopper body to exit therethrough.

The hoppers are mounted at different heights for dispensing the slats and stringers in stacked arrangement to “build” the pallet. Thus, the bottom of the hopper body of the first slat hopper is spaced above the conveyor at least slightly more than an upper surface of the carrier; the bottom of the hopper body of the stringer hoppers are spaced above the conveyor at least slightly more than a top of a bottom slat resting on an upper surface of the carrier; and the bottom of the hopper body of the second slat hopper is spaced above the conveyor at least slightly more than a top of a stringer resting on a bottom slat resting on an upper surface of the carrier.

Although the assembly apparatus requires only one first slat hopper and one second slat hopper, the assembly apparatus provides at least two stringer hoppers and in one preferred embodiment provides three stringer hoppers. The stringer hoppers are preferably mounted side-by-side and are adapted to dispense stingers at substantially the same time.

In one preferred embodiment of the present invention, the nailer comprises an automatic nail gun associated and aligned with each of the stringer hoppers. To facilitate nailing of the top and bottom slats, the apparatus preferably provides a first nailer mounted vertically over the assembly path that is positioned and adapted to nail the top slats to the stringers and a second nailer mounted vertically under the assembly path that positioned and adapted to nail the bottom slats to the stringers.

An alternative embodiment provides a nailer controller adapted to actuate the nailer. In alternative embodiments, the nailer controller is at least one mechanical switch, at least one photoelectric switch, and at least one computer-controlled switch.

Another embodiment of the present invention provides an automatic material loader adapted to move raw material from a material supply to the first slat hopper, the stringer hopper, and the second slat hopper. One preferred embodiment of the automatic material loader comprises an overhead crane and a material supply conveyor positioned proximal the conveyor. A first slat hopper proximity switch, a stringer hopper proximity switch, and a second slat hopper proximity switch attached to the first slat hopper, the stringer hopper, and the second slat hopper respectively. The proximity switches are adapted to detect when the respective hoppers require additional material therein. A material loader controller in communication with the overhead crane, the material supply conveyor, the first slat hopper proximity switch, the stringer hopper proximity switch, and the second slat hopper proximity switch controls the position and operation of the overhead crane and the material supply conveyor in response to feedback from the first slat hopper proximity switch, the stringer hopper proximity switch, and the second slat hopper proximity switch to maintain the hoppers full of slats and stringers.

Another aspect of the present invention provides an automatic pallet making apparatus for assembling pallets from slats and stringers, the apparatus comprising means for aligning the slats and the stringers during assembly of a pallet, means for moving the means for aligning along an assembly path in a downstream direction, and means for dispensing slats, one at a time, onto the means for aligning as the means for aligning passes the means for dispensing slats, the means for dispensing slats positioned in the assembly path. The means for aligning is adapted to align the slats pulled from the means for dispensing slats onto the means for aligning substantially in a single plane and with the slats defines a bottom of the pallet. Means for dispensing at least two stringers transversely onto the slats previously dispensed onto the means for aligning as the means for aligning passes the means for dispensing at least two stringers is also provided in the assembly path downstream from the means for dispensing slats. Likewise, means for dispensing additional slats, one at a time, transversely onto the stringers previously dispensed onto the previously dispensed slats as the means for aligning passes the means for dispensing additional slats is provided in the assembly path downstream from the means for dispensing stringers. Finally, means for fastening the slats, resting on the means for aligning, to the stringers, resting on the means for aligning, to form an assembled pallet is also provided.

One preferred alternative embodiment further provides means for controlling the means for fastening. Another alternative embodiment provides means for automatically filling the means for dispensing slats, the means for dispensing at least two stringers, and the means for dispensing additional slats.

One aspect of the carrier apparatus provides means for supporting the slats and the stringers during assembly, means for pulling a first layer of spaced bottom slats onto the means for supporting as the means for supporting moves in a forward direction, means for pulling at least two stringers onto the bottom slats as the means for supporting moves in a forward direction, and means for pulling a second layer of spaced top slats onto the stringers as the means for supporting moves in a forward direction.

Yet another aspect of the invention provides a method for automatically assembling pallets from slats and stringers. The method comprises moving at least one carrier along an assembly path in a downstream direction, dispensing a first layer of a plurality of slats, one at a time, onto the at least one carrier as the at least one carrier moves downstream along the assembly path, then dispensing at least two stringers transversely onto the slats previously dispensed onto the at least one carrier as the at least one carrier continues moving downstream along the assembly path, next dispensing a second layer of a plurality of slats, one at a time, transversely onto the stringers previously dispensed onto the previously dispensed slats as the at least one carrier continues moving downstream along the assembly path, and then fastening the first and second layers of slats, resting on the at least one carrier, to the stringers, resting on the at least one carrier, to form an assembled pallet.

In one preferred embodiment of the method, the dispensing of the first layer of the plurality of slats comprises moving a plurality of bottom slat detents so that at least a portion of each of the plurality of bottom slat detents extends above an upper surface of the at least one carrier, moving the at least one carrier downstream along the assembly path past a bottom slat hopper, the plurality of bottom slat detents are adapted to pull slats from the bottom slat hopper; the dispensing of the at least two stringers comprises after the at least one carrier has moved past the bottom slat hopper, moving at least one stringer detent so that at least a portion of the at least one stringer detent extends above the previously dispensed slats, moving the at least one carrier downstream along the assembly path passing at least two stringer hoppers, the at least one stringer detent is adapted to pull stringers from the at least two stringer hoppers; and the dispensing of the second layer of the plurality of slats comprises after the at least one carrier has moved past the at least two stringer hoppers, moving a plurality of top slat detents so that at least a portion of each of the plurality of top slat detents extends above the previously dispensed stringers, and moving the at least one carrier downstream along the assembly path passing a top slat hopper, the plurality of top slat detents are adapted to pull slats from the top slat hopper.

Another preferred embodiment of the method provides for, after fastening the first and second layers of slats to the stringers, moving the plurality of bottom slat detents, the at least one stringer detent, and the plurality of top slat detents to a resting position in which they are removed from the assembled pallet. An additional preferred embodiment of the method provides the step of, after removing the detents from the assembled pallet, removing the assembled pallet from the carrier.

BRIEF DESCRIPTION OF THE DRAWINGS

The manner in which these objectives and other desirable characteristics can be obtained is explained in the following description and attached drawings in which.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention generally provides an automatic pallet making apparatus for assembling pallets from slats and stringers. The apparatus provides a conveyor having at least one carrier attached thereto. The conveyor is adapted to move the carriers downstream along an assembly path defined by the conveyor. Positioned along the assembly path sequentially in the downstream direction are: (1) a first slat hopper, (2) at least two stringer hoppers, (3) a second slat hopper, and (4) at least one nailer. As the conveyor moves the carrier downstream along the assembly path, the carrier pulls a bottom layer of slats from the first slat hopper, then a set of stringers onto the bottom slats, and then a top layer of slats onto the stringers. The nailer then nails the slats to the stringers. To accomplish the withdrawal of the slats and stringers from the respective hoppers, the carrier provides a set of detents that are selectively moved into and out of position. In general, the respective detents are moved into position just before the respective hopper from which the detents are designed to draw material. However, when in position, the detents are necessarily positioned in the pallet abutting the components they pulled from the hoppers. Thus, after the pallet is nailed together, the detents are moved out of position to a resting position in which they are removed from the assembled pallet so that the assembled pallet may be removed from the carrier.

Figure 1:
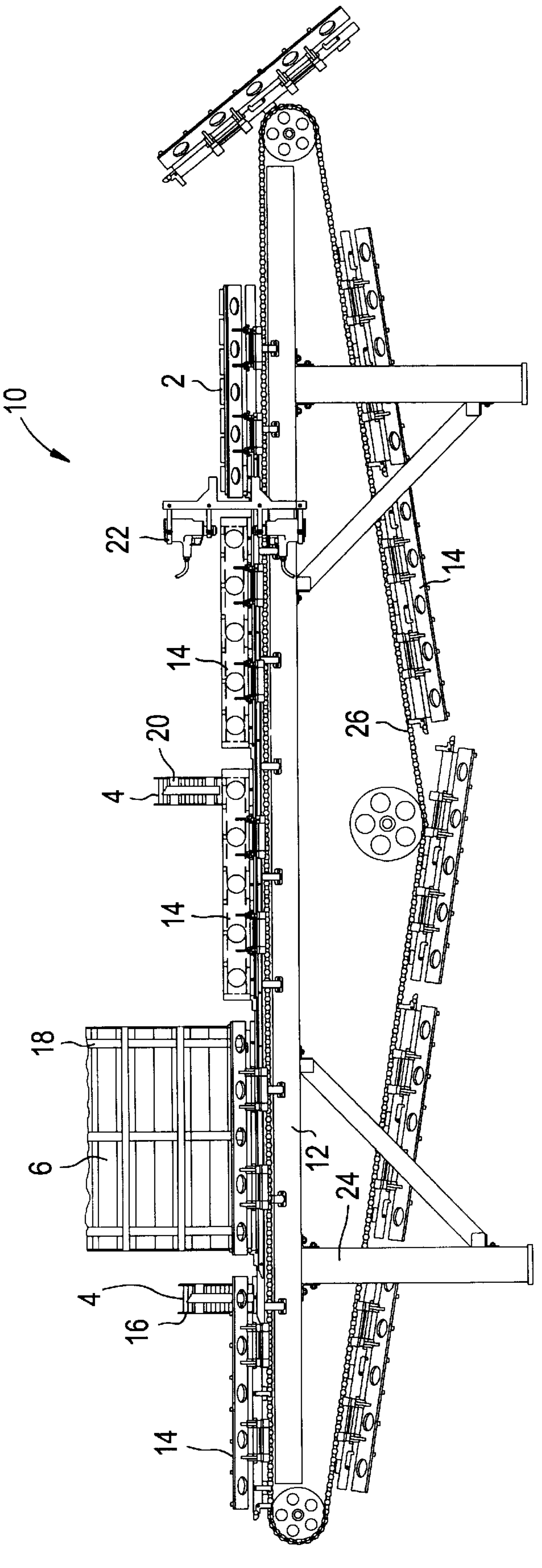
FIG. 1 is a side elevational view of the present invention.

FIG. 1 is a side elevational view of the pallet making apparatus 10. In general, the apparatus 10 comprises a conveyor 12, at least one (but preferably a plurality of) carriers 14 attached to the conveyor 12, a first slat hopper 16, at least two stringer hoppers 18, a second slat hopper 20, and at least one nailer 22.

In the preferred embodiment, the conveyor 12 comprises an elongated frame resting on the ground or floor and having supports that support the conveyor 12 above the floor. An endless conveyor belt 26 is movably attached to the frame (by, for example, pulleys, sprockets, or other common devices) so that the conveyor belt 26 may rotate continuously about the frame. Note that the term “conveyor” as used herein is well understood in the art as the name for a structure that carries packages or material from place to place as by an endless moving belt or a chain of receptacles. The present invention incorporates those components and alternatives commonly found on conveyors, such as intermediate supports, bearings, and the like. Additionally, examples of suitable conveyor belts 26 includes those comprising a chain, a belt, or other commonly used conveyor belt 26 material. A drive motor attached to the conveyor belt 26 provides the actuator for moving the conveyor belt 26. The motor is attached to the conveyor belt 26 by any common, well-known device such as a sprocket, a pulley, or other device. Thus, the drive motor is adapted to rotate the conveyor belt 26 about the conveyor frame 24 as the drive motor rotates.

The conveyor frame 24 defines a relatively flat upper surface between the ends of the conveyor frame 24 over which the conveyor belt 26 moves as shown in FIG. 1. Thus, the conveyor belt 26 also defines a substantially flat upper surface between the ends of the conveyor frame 24. In the preferred embodiment, the conveyor belt 26 moves in one direction in relation to the conveyor frame 24 during operation of the apparatus 10 (although reversal of the conveyor belt 26 may be allowed in certain circumstances such as during maintenance and repair). The operational direction of movement of the conveyor belt 26 over the upper surface of the conveyor frame 24, the direction in which the conveyor belt 26 moves the attached carriers 14 over the upper surface of the conveyor during operation of the apparatus 10, is referred to herein as the “downstream” direction. In FIG. 1, the downstream direction of the conveyor 12 is left to right. Also, as used herein, the term “assembly path” shall refer to the path along which the carriers 14 move along the upper surface of the conveyor 12 during operation. Thus, a carrier 14 moving downstream along the assembly path moves (as shown in FIG. 1) from left to right over the upper surface of the conveyor 12. Therefore, the purpose of the conveyor 12 is to move the carriers 14 along the assembly path in a downstream direction.

The bottoms of the plurality of carriers 14 are attached to the conveyor belt 26. The carriers 14 may be fixedly attached or removably attached to the conveyor belt 26 and the attachment may take any form. For example, the attachment may be a weld, a bolt, a standard conveyor "F"attachment, a clamp, or any other form of attachment that is suitable for use with conveyors.

Figure 2:
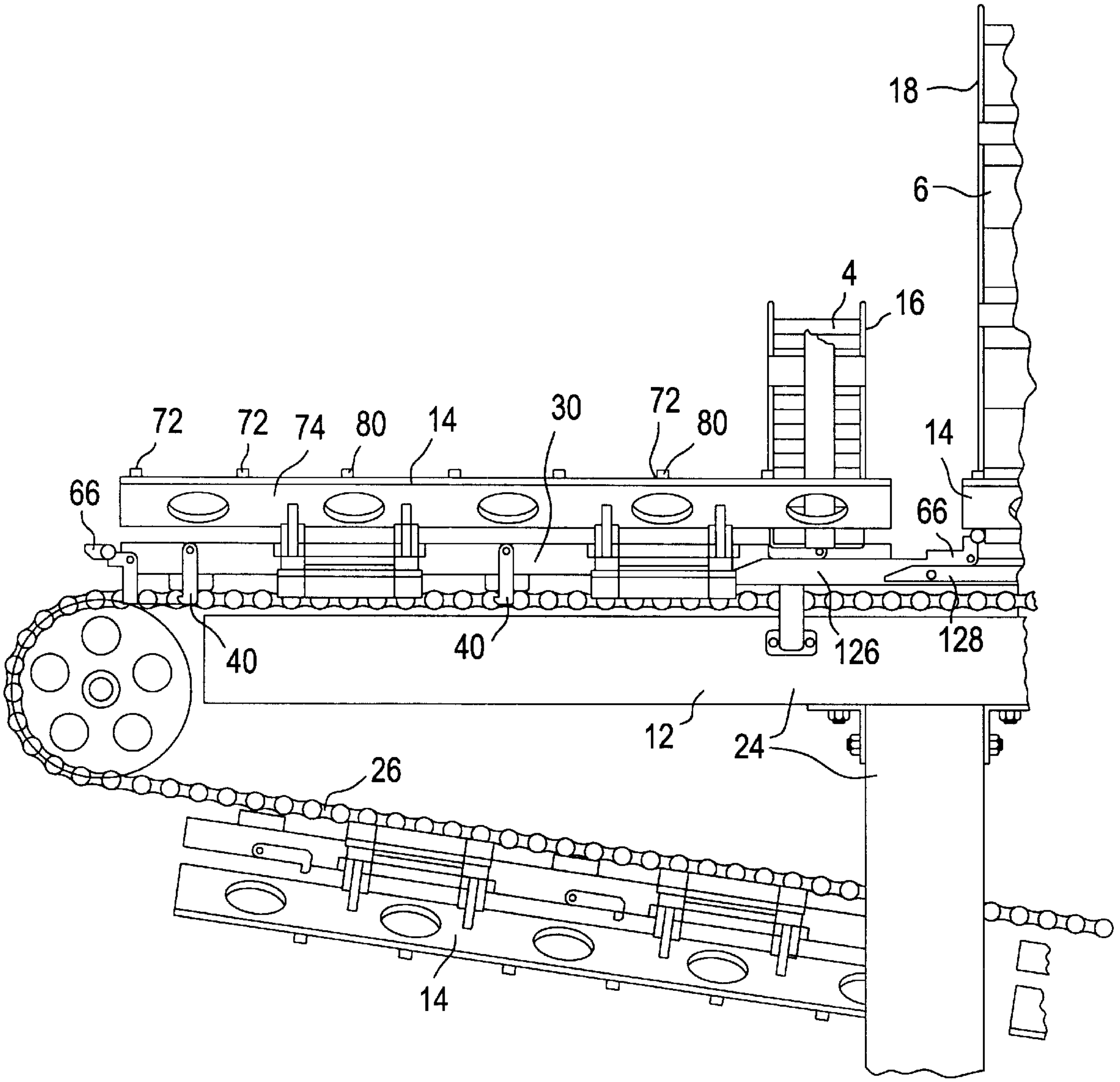
FIG. 2 is a partial side elevational view of the present invention.
Figure 3:
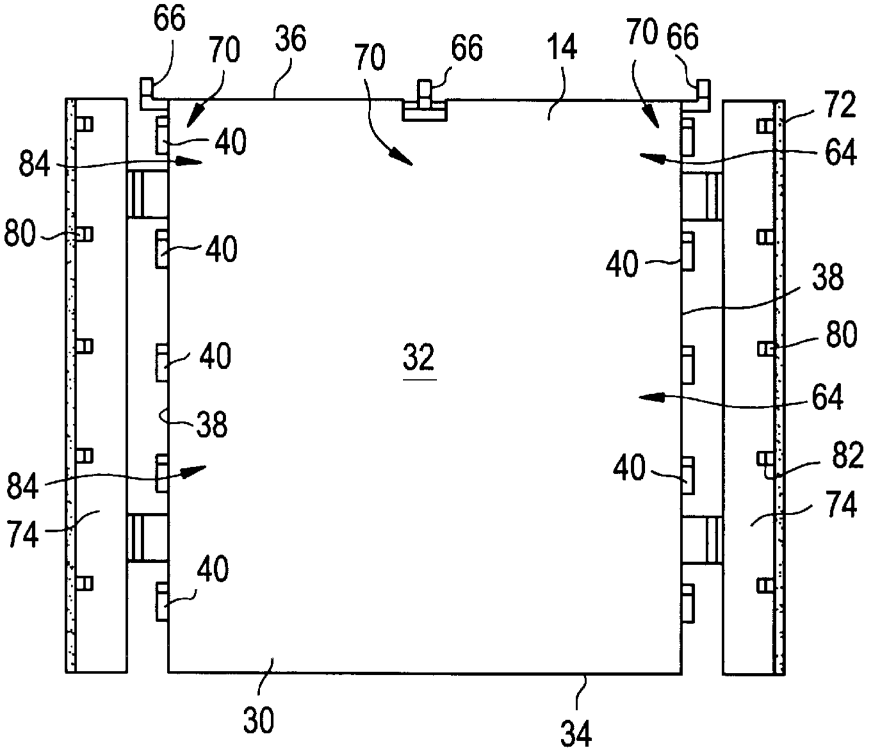
FIG. 3 is a top view of a carrier.
Figure 4:
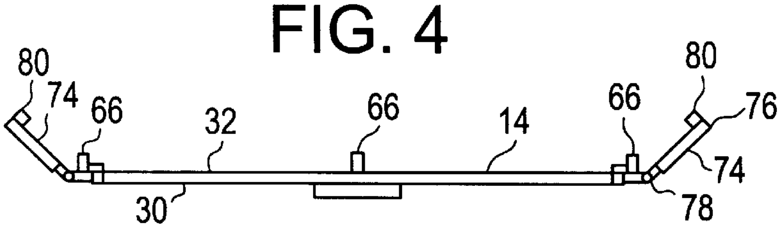
FIG. 4 is an end view of a carrier.

The carriers 14 are for pulling the slats 4 and stringers 6 from the respective hoppers and for aligning the slats 4 and stringers 6 during assembly of the pallet 2. In general, the carrier 14 provides a base 30 for supporting the pallet 2 and pallet components and a set of detents attached to the base 30 for sequentially pulling the slats 4 and stringers 6 from the hoppers. FIGS. 1 and 2 show side elevational views of the carrier 14; FIG. 3 is a top view of the carrier 14; and FIG. 4 is an end view of the carrier 14. FIGS. 1 through 4 show a preferred embodiment of the carrier 14, other embodiments are also discussed below.

The base 30 of the carrier 14 has a substantially flat upper surface 32, a front 34, a back 36, and opposing sides 38. An attachment connected to the carrier 14 and previously discussed provides for attachment of the carrier 14 to the conveyor belt 26. The front 34 of the carrier 14 is positioned downstream of the back 36 as the carrier 14 moves along the assembly path.

A plurality of bottom slat detents 40 attached to the base 30 are spaced between the front 34 and the back 36 and are adapted to selectively extend above the upper surface 32 of the base 30. As will be seen from the following discussion, the first slat hopper 16 is adapted and positioned to hold slats 4 slightly above the level of the upper surface 32 of the base 30. Thus, extending the bottom slat detents 40 above the upper surface 32 of the base 30 allows the bottom slat detents 40 to abut an upstream side of the slat in the first slat hopper 16 and, as the carrier 14 moves past the first slat hopper 16, pull a slat from the hopper. Another slat within the hopper moves to the lowest position and is then available for the next bottom slat detent 40 passing the first slat hopper 16. Thus, each bottom slat detent 40 that passes the first slat hopper 16 pulls a slat from the first slat hopper 16 onto the upper surface 32 of the base 30.

Many possible embodiments exist for the bottom slat detents 40. In one preferred embodiment shown in FIGS. 1 through 4, each of the bottom slat detents 40 comprise a pivot pin 42 mounted to the sides 38 of the base 30. The pivot pin 42 has a pivot end 44 pivotally mounted to the base 30 and an apogee end 46 opposite the pivot end 44 defining a catch 48. The pivot pin 42 is free to rotate about the pivotal mounting between a resting position and an actuated position. In the actuated position, at least a portion of the pivot pin 42, the catch 48, extends above (or vertically higher than) the upper surface 32 of the base 30; in the resting position, the pivot pin 42 is rotated so that the catch 48 is lower than the upper surface 32 of the base 30.

Figure 5:
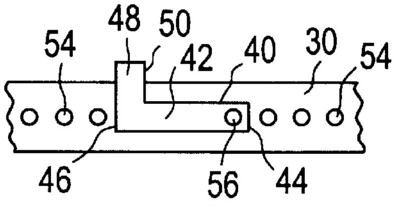
FIG. 5 is a partial side view of a pivot pin and a base of a carrier.

The catch 48 defines a forward abutment surface 50 adapted to abut the side of a bottom slat. FIG. 5 is a side elevational view of the embodiment of the pivot pin 42 shown in FIGS. 1 through 4. In this embodiment, the pivot pin 42 is relatively straight along its length with the catch 48 comprising a raised portion at the apogee end 46 of the pivot pin 42. The raised portion extends upward, substantially perpendicular from the pivot pin 42 when the pivot pin 42 is in the actuated position. In this position, the forward abutment surface 50 is substantially perpendicular to the upper surface and substantially parallel to the upstream side of the slats 4 to provide the most surface area contact between the abutting surfaces. Note, however, that angled surfaces are anticipated and equivalent to the preferred structure.

Figure 6:
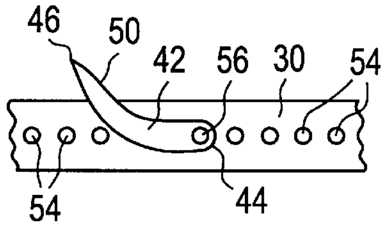
FIG. 6 is a partial side view of a pivot pin and a base of a carrier.

FIG. 6 shows an alternative preferred embodiment for the pivot pin 42 wherein the pivot pin 42 is arcuate along at least a portion of its length. As shown in the figure, the curve of the pivot pin 42 allows the apogee end 46 to extend above the upper surface 32 of the base 30 when the pivot pin 42 is in the actuated position. The portion of the pivot pin 42 extending above the upper surface defines the catch 48.

Figure 7:
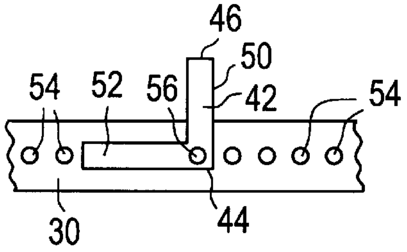
FIG. 7 is a partial side view of a pivot pin and a base of a carrier.

FIG. 7 shows another alternative preferred embodiment for the pivot pin 42. In this embodiment, the pivot pin 42 also includes an actuating tab 52 attached to the pivot pin 42 and extending at an angle (preferably ninety degrees) therefrom. A force exerted on the actuating tab 52 causes the pivot pin 42 to rotate about the pivot point moving the pivot pin 42 between the resting and actuated positions.

As illustrated in FIG. 5 through 7, the pivot pin 42 may take any form that is or becomes known to those skilled in the art to be capable of moving a catch 48 of the pivot pin 42 between a resting and actuated position as defined herein. Accordingly, the present description is not limited to those specifically shown in the figures.

So that the carrier 14 and the apparatus 10, may be used to construct a variety of pallet sizes, the bottom slat detents 40 are preferably adapted to be adjusted between the front 34 and the back 36 of the base 30. Thus, in the preferred embodiment, the detents are removably and/or movably attached to the base 30.

As applied to the previously described embodiment wherein the bottom slat detents 40 comprise pivot pins 42, the pivot pin 42 is removably attached to the base 30 and is adapted to be selectively, adjustably positioned between the front 34 and back 36 of the base 30. In one embodiment, the base 30 defines a plurality of threaded hinge bores 54 (see FIGS. 5 through 7) spaced between the front 34 and the back 36 of the base 30. Preferably, the threaded hinge bores 54 are spaced relatively close to one another to provide greater flexibility in positioning of the pivot pins 42. The pivot pin 42 is connected to the base 30 by a threaded hinge pin 56 extending through a hinge bore 54 in the pivot pin 42 and mating with one of the mating, threaded hinge bores 54. The hinge bore 54 has a diameter greater than the diameter of the hinge pin 56 which allows the pivot pin 42 to rotate on the hinge pin 56, but a head of the hinge pin 56 prevents the pivot pin 42 from falling off the hinge pin 56.

Figure 8:
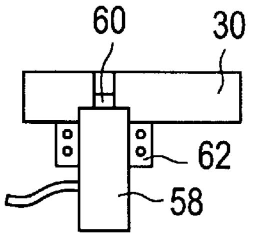
FIG. 8 is a partial side view of a solenoid and a base of a carrier.

The lower slat detent may take other forms than the pivot pin 42. FIG. 8 shows one alternative using a solenoid 58 as the lower slat detent. The term "solenoid 58" as used herein is well understood in the art as the name for a structure that has a coil of wire commonly in the form of a cylinder that when carrying a current resembles a bar magnet so that a movable core 60 is drawn into the coil when the current flows. Thus, the solenoid 58 has a selectively movable core 60 that is movable between an actuated position (in which at least a portion of the core 60 extends vertically higher than the upper surface 32 of the base 30) and a resting position (in which the core 60 does not extend vertically higher than the upper surface 32 of the base 30). The upper end of the core 60 is adapted and positioned to extend above the upper surface 32 of the base 30 when the core 60 is in the actuated position and, thereby, provide a catch 48, or abutment surface, for pulling a slat from the first slat hopper 16. The solenoid 58 may be mounted to the base 30 in a variety of ways including by use of a bracket 62, clamp, or other means. Using a bracket 62 or clamp slidably attached to the base 30, allows for adjustment of the position of the solenoid 58 between the front 34 and back 36 of the base 30.

Other embodiments similar to the embodiment using the solenoid 58 for the bottom slat detent 40 include devices that move a pin, core 60, catch 48, ram, or other device vertically. For example, the bottom slat detent 40 may comprise a hydraulic or pneumatic cylinder wherein the ram of the cylinder comprises the catch 48, a rotatable pin pivotally attached to the base 30 intermediate its ends, or any other movable catch 48 capable of pulling a slat from the bottom slat hopper 18. Likewise, a purely mechanical equivalent to the axially-movable ram uses a biased pin mounted to the base 30 and movable between a resting position and an actuated position. The pin may be biased toward either the actuated or resting position. For those embodiments in which the pin is biased toward the resting position a releasable latch is used to selectively maintain the biased pin in the actuated position; for those embodiments in which the pin is biased toward the actuated position a releasable latch is used to selectively maintain the biased pin in the resting position. In each case, the pin defines a catch 48 for pulling a slat from the bottom slat hopper when the pin is in the actuated position. A spring may be used to bias the pin.

The bottom slat detents 40 are spaced between the front 34 and back 36 of the base 30. In the embodiment shown in FIGS. 1 through 4, the bottom slat detents 40 are attached to the sides 38 of the base 30. So that the detents maintain a proper orientation of the slats 4 on the carrier 14, the carrier 14 provides sets of two bottom slat detents 40 associated with each bottom slat position 64 on the base 30. In other words, the bottom slat detents 40 are provided in pairs with each pair having a bottom slat detent 40 mounted on each side 38 of the base 30 aligned with one another between the front 34 and the back 36 of the base 30. The embodiment shown in the figures discloses a carrier 14 defining five bottom slat positions 64 between the front 34 and the back 36 of the base 30 (the carrier 14 has five pairs of bottom slat detents 40 spaced between the front 34 and the back 36 of the base 30). The bottom slat positions 64 are substantially evenly spaced from one another and are aligned substantially horizontally, substantially parallel to the front 34 and back 36 of the base 30. Although the figures primarily show five bottom slat positions 64, the carrier 14 may define any number of bottom slat positions 64, particularly considering the flexibility provided with the removable and movable bottom slat detents 40. By adding, removing, or moving bottom slat detents 40, the carrier 14 can be made to accommodate different numbers of slats 4 and different sizes and spacing of slats 4. Note that the above description describes one preferred embodiment and that other preferred embodiments may use a single bottom slat detent 40 to define each bottom slat position 64 or may use sets of three or more bottom slat detents 40 to define each bottom slat position 64.

At least one stringer detent 66 is attached to the base 30 proximal the back 36 of the base 30. The stringer detent 66 is adapted to selectively extend to a position above the base 30 so that the stringer detents 66 may pull at least one stringer from a stringer hopper 18 onto the bottom slats 4 resting on the upper surface 32 of the base 30. As will be seen from the following discussion, the stringer hoppers 18 are adapted and positioned to hold stringers 6 slightly above the level of the bottom slats 4 resting on the base 30 of the carrier 14. Thus, the stringer detent 66 must extend above the upper surface 32 of the base 30, in the vertical direction, a distance that is at least slightly greater than the thickness of the bottom slats 4. Extending the stringer detent 66 above the bottom slats 4 allows the stringer detent 66 to abut an upstream side of the bottom stringer held in the stringer hopper 18 and, as the carrier 14 moves past the stringer hopper 18, pull a stringer from the stringer hopper 18. Another stringer held within the stringer hopper 18 then moves to the lowest position and is available for the next stringer detent 66 of the next carrier 14 passing the stringer hopper 18. Thus, each stringer detent 66 passing the stringer hopper 18 pulls a stringer from the stringer hopper 18.

The stringers 6 preferably extend the full length of the assembled pallet 2. Therefore, since the stringer detent 66 pulls a stringer by abutting an upstream side of the stringer, the stringer detent 66 is preferably positioned proximal the back of the carrier 14 and its base 30. However, for flexibility in positioning of the stringers 6 laterally between the sides of the pallet 2, the stringer detents 66 are, in one preferred embodiment, adjustably positioned between the opposing sides 38 of the base 30.

As with the bottom slat detents 40, the stringer detents 66 have many possible embodiments. FIGS. 1 through 4 disclose one such preferred embodiment. As shown in the figures, the carrier 14 has three stringer detents 66 mounted proximal the back 36 of the base 30 and each comprising a pivot pin 42. The pivot pin 42 has a pivot end 44 and an apogee end 46 with the pivot end 44 pivotally mounted to the base 30. Also, extending from the pivot end 44 at an angle (preferably 90°) to the main body of the pivot pin 42 is an actuating tab 52 that facilitates actuating movement of the pivot pin 42. The pivot pin 42 is movable between a resting position and an actuated position. The apogee end 46 of the pivot pin 42 defines a catch 48 that defines a forward abutment surface 50 adapted to abut a side of a stringer. In the actuated position, the catch 48 extends above the bottom slats 4 resting on the base 30 to the vertical position previously described in which the catch 48 may pull a stringer from the stringer hopper 18. In the resting position, the catch 48 of the pivot pin 42 is not in the actuated position and is preferably positioned below the upper surface 32 of the base 30.

Figure 9:
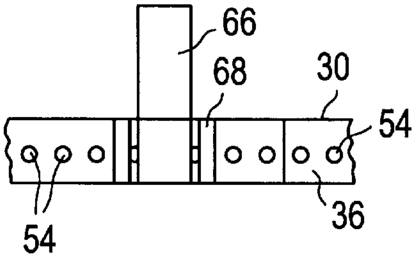
FIG. 9 is a partial back elevational view of a stringer detent, pivot pin and the base of the carrier.
Figure 10:
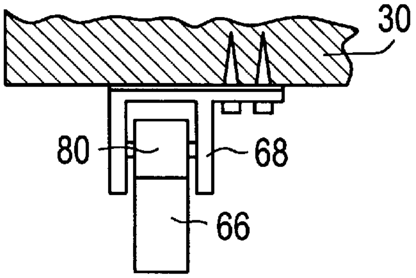
FIG. 10 is a partial top elevational view of a stringer detent, pivot pin and the base of the carrier.

FIGS. 9 and 10 are top back and top views respectively of one preferred embodiment of the pivot pin 42, comprising the stringer detent 66, attached to the back 36 of the base 30 that is adapted to be selectively, adjustably positioned between the opposing sides 38 of the base 30. In this embodiment, the pivot pin 42 is mounted to a mounting bracket 68 to which the hinge pin 56 of the pivot pin 42 is attached. The bracket 68 is then removably attached to the back 36 of the base 30 using one or more fasteners, such as screws, cooperatively attached to one or more matching threaded attachment holes. The back 36 of the base 30 defines a plurality of attachment holes between the opposing sides 38 of the base 30, thereby, defining a plurality of possible attachment positions for the pivot pin 42.

In addition to being movable, the stringer detent 66 is preferably removable to facilitate variety in the number of stringers 6 used in constructing the pallet 2. With removable stringer detents 66, the carrier 14 may be made to pull two stringers 6 for one application and four stringers 6 for another application by adding/removing stringer detents 66 (and the associated stringer hoppers 18).

In the embodiment of the stringer detent 66 shown in FIGS. 1 through 4, the pivot pin 42 is relatively straight between the pivot end 44 and the apogee end 46 with the catch 48 comprising a portion of the apogee end 46 that defines a substantially perpendicular (to the upper surface 32 of the base 30) forward surface when the pivot pin 42 is in the actuated position. The substantially perpendicular surface is, thus, substantially parallel to the upstream surface of the stringer providing a greater amount of surface contact between the catch 48 and the stringer. Note that angled surface are also acceptable.

Alternative embodiments for the stringer detent 66 include detents shaped similarly to those shown in FIGS. 5 and 6 and as previously described in connection with the bottom slat detent 40. The stringer detents 66 may operate substantially the same as the bottom slat detents 40 and may, therefore, have the same structure and operation. Accordingly, additional description of these alternatives is not necessary for one skilled in the art to adapt the previously described alternatives for bottom slat detents 40 for use as stringer detents 66.

Similarly, the stringer detent 66 may comprise a solenoid 58 as previously described as an alternative for use as a bottom slat detent 40 and as illustrated in FIG. 8. The solenoid 58 used for the stringer detent 66 would simply be attached to the base 30 proximal the back 36 of the base 30 of the carrier 14. It has a selectively movable core 60 movable between a resting position and an actuated position. The upper end of the core 60 is adapted and positioned to extend above the bottom slats 4 when in the actuated position.

Likewise, other embodiments for the stringer detent 66 may be made without departing from the scope of the present invention. For example, the stringer detent 66 may be a hydraulic or pneumatic cylinder, a spring-biased pin, a rotatable pin pivotally attached to the base 30 intermediate its ends, or any other movable catch 48 capable of pulling a stringer from a stringer hopper 18.

Depending upon the placement and width of the stringer detent 66, a single stringer detent 66 may pull stringers 6 from one or more stringer hoppers 18. For example, if the stringer detent 66 extends substantially the full width of the back 36 of the base 30, it can pull stringers 6 from hoppers positioned proximal each side of the carrier 14. Thus, the stringer detent 66 may define one or more stringer positions 70 (the position of a stringer, pulled from a stringer hopper 18, on the bottom slats 4 resting on the carrier 14 and in the assembled pallet 2). The stringer positions 70 extend laterally to the bottom slat positions 64 (and the front 34 and the back 36 of the base 30) and, preferably, substantially perpendicular thereto. For the greatest flexibility, each stringer detent 66 preferably defines one stringer position 70 allowing greater variation in stringer detent 66 positioning. Although more than one stringer detent 66 may be used to define each stringer position 70, using a single stringer detent 66 for each stringer position 70 is preferred.

The carrier 14 also has a plurality of top slat detents 72 attached to the base 30 that are spaced between the front 34 and the back 36 of the base 30. The top slat detents 72 are adapted to selectively extend to a position above the base 30 to a position where it the top slat detents 72 may pull at least one top slat from a second slat hopper 20 onto the stringers 6 resting on the carrier 14. As will be seen from the following discussion, the second slat hoppers 20 are adapted and positioned to hold slats 4 slightly above the level of the stringers 6 resting on the carrier 14. Thus, the top slat detents 72 must extend above the upper surface 32 of the base 30, in the vertical direction, a distance that is at least slightly greater than the combined thickness of the bottom slats 4 and the stringers 6 resting on the bottom slats 4. Extending the top slat detents 72 above the stringers 6 allows the top slat detents 72 to abut an upstream side of the bottom slat held in the second slat hopper 20 and, as the carrier 14 moves past the second slat hopper 20, pull a slat from the second slat hopper 20. Another slat held within the second slat hopper 20 then moves to the lowest position and is available for the next top slat detent 72 passing the second slat hopper 20. Thus, each top slat detent 72 passing the second slat hopper 20 pulls a slat from the second slat hopper 20.

However, to accomplish the required positioning of the top slat detents 72 the top slat detents 72 must necessarily reach vertically over the bottom slats 4 (forming the bottom of the pallet 2) resting on the carrier 14 in order for the top slats 4 and bottom slats 4 forming the pallet 2 to have the same length and, thus, the top and bottom of the pallet 2 to have the same width. Because the bottom slats 4 are positioned on the carrier 14 before the top slats 4, the top slat detents 72 must extend over the bottom slats 4 (although they may extend between the bottom slats 4 to a position "vertically" over the bottom slats 4; see alternative embodiment below). Like the bottom slat detents 40, the top slat detents 72 are preferably selectively adjustably positioned between the front 34 and the back 36 of the base 30 to provide flexibility in positioning, size, and number of slats 4.

FIGS. 1 through 4 show one preferred alternative embodiment for the top slat detents 72. In this embodiment, the plurality of top slat detents 72 comprise a side flap 74 rotatably attached to each side 38 of the base 30. Each side flap 74 has a pivot end 76, pivotally attached to the base 30, and an apogee end 78 defining at least one catch 80. In the embodiment shown in FIGS. 1 through 4, the apogee end 78 of the flap defines a plurality of catches 80 spaced between the front 34 and the back 36 of the base 30 and, more specifically, defines the same number of catches 80 as defined by the bottom slat detents 40 so that the resulting assembled pallet 2 comprises the same number top slats 4 as bottom slats 4. The side flaps 74 are movable between a resting position and an actuated position. In the actuated position, the catches 80 defined by the apogee end 78 of the side flaps 74 are positioned to extend over the upper surface 32 of the base 30 a distance at least slightly greater than the distance from the upper surface 32 of the base 30 to the top of the stringers 6 resting on the base 30. When in the actuated position, the catches 80 are adapted and positioned to abut a side of a top slat and pull a top slat from the second slat hopper 20 with a forward abutment surface 50 of the catches 80.

Similar to the first slat hopper 16 and the stringer hopper 18 and as further discussed below, the second slat hopper 20 is adapted and positioned to hold slats 4 slightly above the level of the stringers 6 resting on the carrier 14. Thus, extending the top slat detents 72 above the upper surface 32 of the base 30 a distance at least slightly greater than the combined thickness of the slats 4 and stringers 6 resting on the base 30 allows the top slat detents 72 to abut an upstream side of the slat in the second slat hopper 20 and, as the carrier 14 moves past the second slat hopper 20, pull a slat from the hopper. Another slat within the hopper moves to the lowest position and is then available for the next top slat detent 72 passing the second slat hopper 20. Thus, each top slat detent 72 that passes the second slat hopper 20 pulls a slat from the second slat hopper 20 onto the stringers 6 resting on the carrier 14.

In the embodiment shown in FIGS. 1 through 4, the catches 80 are side abutments 82 extending from an inner surface of the side flaps 74 laterally inward, and preferably at a right angle thereto, toward the center of the carrier 14. The side flaps 74 are positioned outside the bottom slat detents 40 and the stringer detents 66 and are pivotally mounted at their bottoms. When in the resting position, the side flaps 74 are angled away from the vertical position and away from the center of the carrier 14. In the actuated position, the side flaps 74 are substantially vertically positioned and the catches 80 extend from the top thereof toward the center of the carrier 14.

To provide proper positioning of the top slats 4 on the stringers 6, each of the catches 80 on one of the side flaps 74 corresponds to and is aligned with one of the side flaps 74 on the other side flap 74, mounted to the opposite side 38 of the base 30. The aligned side flaps 74 define a top slat position 84 within which a top slat rests during assembly of the pallet 2. The top slat positions 84 are spaced between the front 34 and back 36 of the base 30, substantially parallel to the front 34 and the back 36 of the base 30, and are preferably aligned vertically with a corresponding bottom slat position 64. Thus, the top slat detents 72 (the catches 80) are preferably aligned to corresponding bottom slat detents 40 so that top slats 4 are positioned vertically over corresponding bottom slats 4 of the pallet 2.

Figure 11:
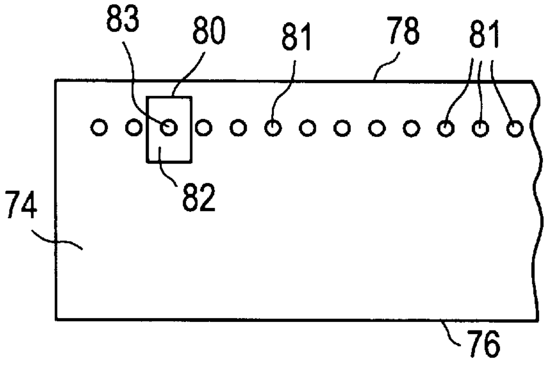
FIG. 11 is a partial side elevational view of a side flap.

Preferably, the catches 80 are adjustably positionable between the front 34 and back 36 of the base 30. In one embodiment, shown in FIG. 11, the side flap 74 defines a plurality of threaded bores 81 therein spaced between the front 34 and the back 36 of the base 30. A threaded attachment pin 83, or fastener (such as a screw or bolt) is adapted to extend through a hole defined in the catch 80 and mate with the threaded bores 81 and, thereby maintain the catch 80 onto the side flap 74. Because the side flap 74 has a plurality of threaded bores 81 to which the catch 80 may be attached, the catch 80 may be positioned at a plurality of positions along the side flap 74. Thus, the position and number of side flaps 74 may be easily adjusted according to the requirements of the specific pallet 2.

Like the bottom slat detents 40 and the stringer detents 66, the top slat detents 72 may take may forms, including, inter alia, solenoids 58, other mechanical pins and devices, and hydraulic and pneumatic devices. In the case of a solenoid 58, the solenoid 58 has a selectively movable core 60 that is movable between an actuated position (in which at least a portion of the core 60 extends over the upper surface 32 of the base 30 to a position where it will abut a side of a top slat) and a resting position (in which the core 60 does not extend to the actuated position and is not over the upper surface and is removed from the assembled pallet 2). The upper end of the core 60 is adapted and positioned to extend over the upper surface 32 of the base 30 when the core 60 is in the actuated position and, thereby, provide a catch 48, or abutment surface, for pulling a slat from the second slat hopper 20. The solenoid 58 may be mounted to the base 30 in a variety of ways including by use of a bracket 62, clamp, or other means. Using a bracket 62 or clamp slidably attached to the base 30, allows for adjustment of the position of the solenoid 58 between the front 34 and back 36 of the base 30.

Accordingly, one preferred embodiment of the carrier 14, as shown in FIGS. 1 through 4, provides a base 30 with a set of bottom slat detents 40 mounted to the sides 38 thereof. The bottom slat detents 40 are mounted in pairs of pivot pins 42 mounted on opposite sides 38 of the base 30 with each pair defining a bottom slat position 64. The bottom slat positions 64 are substantially evenly spaced parallel to one another between the front 34 and back 36 of the base 30. The bottom slat detents 40 selectively move above the upper surface 32 of the base 30 to pull slats 4 from the first slat hopper 16. Three stringer detents 66 mounted near the back 36 of the base 30 selectively extend above the bottom slats 4 to pull stringers 6 from aligned stringer hoppers 18. The stringer detents 66 are evenly spaced from one another with one positioned in the center of the base 30 and the other two attached to opposing sides 38 of the base 30. The stringer detents 66 attached to the sides 38 of the base 30 are positioned laterally outside of the bottom slat detents 40. Note that all or any of the stringer detents 66 may share a common axle (or hinge pin 56) to facilitate rotation of all of the stringer detents 66 together. A side flap 74 is attached to each side 38 of the base 30 and defines a plurality of catches 80 thereon and selectively moves to position the catches 80 in the actuated position. Each catch 80 on the side flap 74 corresponds to and is aligned with a catch 80 on the opposite side flap 74 with the aligned pair of catches 80 defining a top slat position 84. Each of the top slat positions 84 is positioned vertically over a corresponding bottom slat position 64. The side flaps 74 are positioned outside (i.e. further from the center) the stringer detents 66, although the catches 80 extend inward and may extend over the stringer detents 66.

Figure 12:
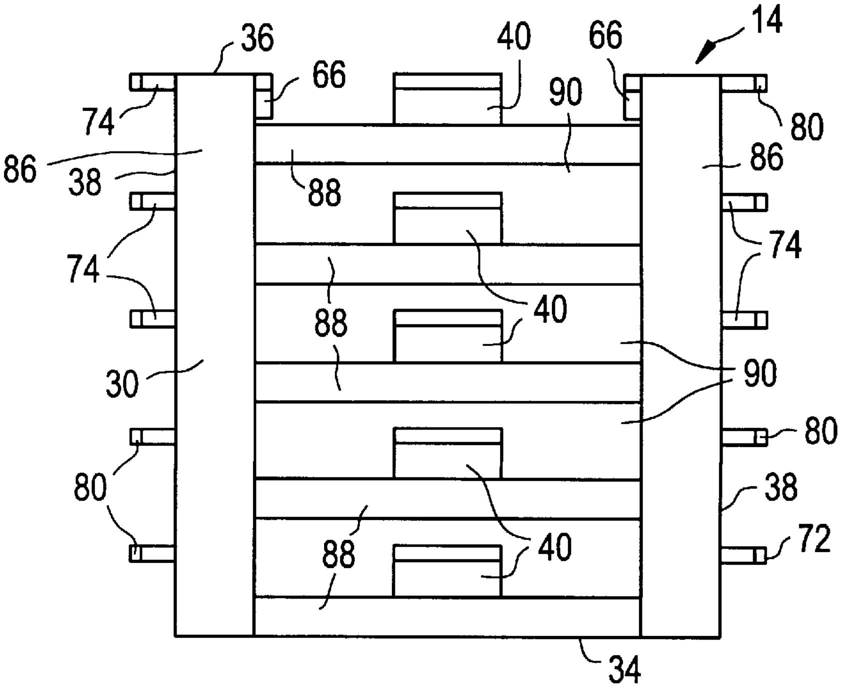
FIG. 12 is a top elevational view of an alternative embodiment for the carrier.

FIG. 12 is a top elevational view of one alternative embodiment of the carrier 14. In this embodiment, the base 30 comprises a pair of spaced parallel side members 86 extending front 34 to back 36 along the sides 38 of the base 30 and a plurality of cross members 88 extending between the side members 86. The bottom slat detents 40 are pivotally mounted to the center of the cross members 88 with each bottom slat detent 40 defining a bottom slat position 64. Thus, the bottom slat detents 40 are sufficiently wide to maintain the desired horizontal orientation of the bottom slats 4. Also, the side members 86 and cross members 88 of the base 30 define a plurality of openings 90. Each of the openings 90 correspond to one of the plurality of bottom slat detents 40 so that each of the plurality of bottom slat detents 40 are attached at and are adapted to selectively extend through the corresponding one of the openings 90. Two stringer detents 66 are mounted near the back of the side members 86. The top slat detents 72 each comprise a side flap 74 having a single catch 80 thereon. Thus, the carrier 14 has a plurality of side flaps 74 attached to the sides 38 of the base 30.

Figure 13:
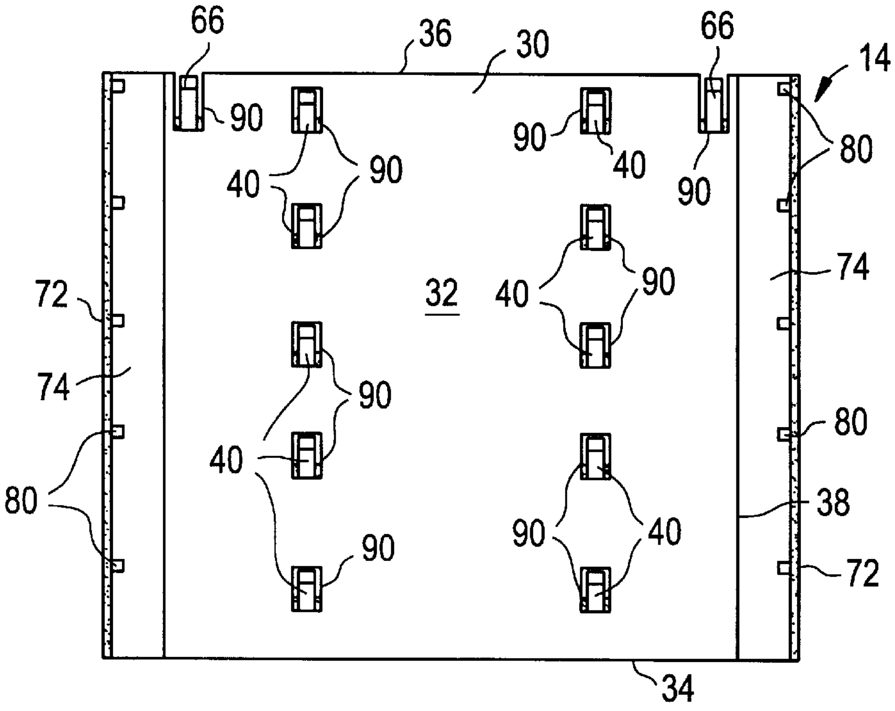
FIG. 13 is a top elevational view of an alternative embodiment for the carrier.

FIG. 13 is a top elevational view of another alternative embodiment of the carrier 14. The base 30 defines a plurality of openings 90 through. Each of a portion of the openings 90 correspond to one of the plurality of bottom slat detents 40 so that each of the plurality of bottom slat detents 40 are attached at and are adapted to selectively extend through the corresponding one of the openings. The remaining portion of the plurality of openings 90 correspond to one of the plurality of stringer detents 66. Each of the plurality of stringer detents 66 are attached at and are adapted to selectively extend through the corresponding one of the openings 90.

Figure 14:
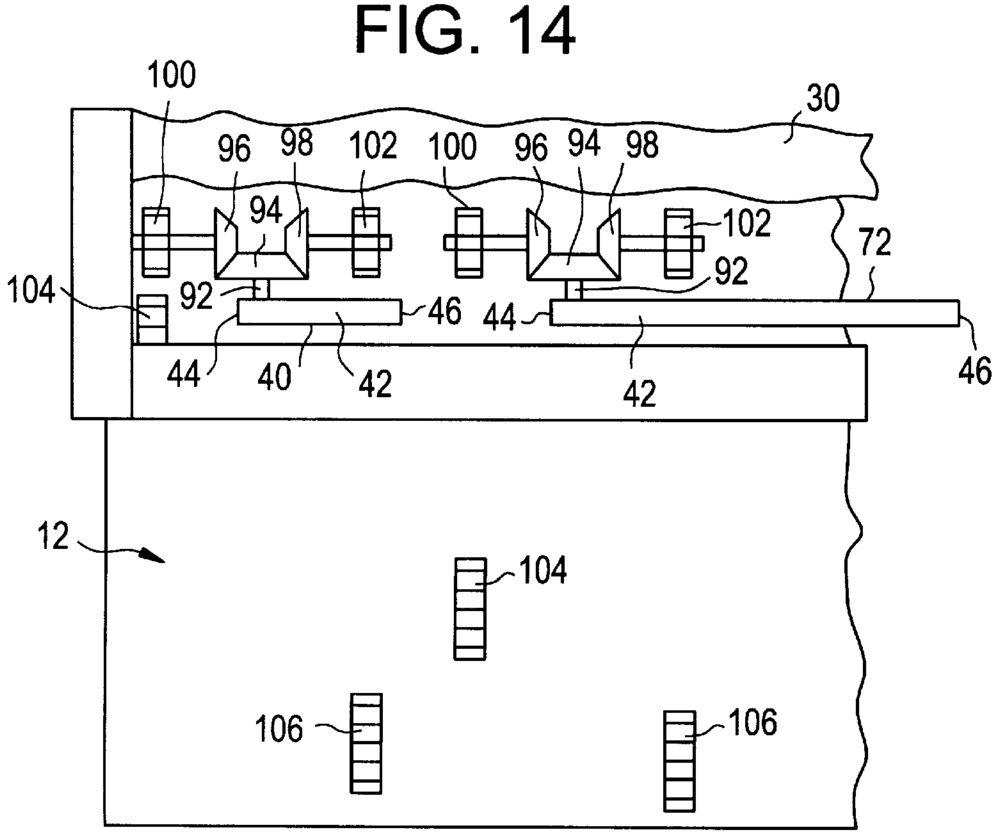
FIG. 14 is a partial top, cross sectional view of a carrier on a conveyor showing detents using a gear assembly.

FIG. 14 is a top, partial cross sectional view of another alternative embodiment for the bottom and top slat detents 72. The stringer detents 66 may also use a similar structure to the one described below and shown in the figure. The detent comprises a pivot pin 42 mounted to an axle 92 at its pivot end 44. Attached to an opposite end of the axle 92 is a right angle gear 94. A first mating right angle pinion 96 is attached to one side of the right angle gear 94 and a second mating right angle pinion 98 is attached to the opposite side of the right angle gear 94. Each of the right angle pinions, 96 and 98, are attached via common shafts to separate pinions, 100 and 102, as shown in the figure. The pinions, 100 and 102, are adapted to mate with racks, 104 and 106, positioned along the assembly path so that, as the pinion 100 attached to the first right angle pinion 96 mates with the corresponding rack 104, the right angle gear 94 rotates in a first direction rotating the pivot pin 42 to an actuated position. Then, as the pinion 102 attached to the second right angle pinion 98 mates with the corresponding rack 106, the right angle gear 94 rotates in a second direction (opposite to the first direction) rotating the pivot pin 42 from the actuated position to a resting position. When this embodiment is used for the top slat detent 72, the pivot pin 42 must extend between the bottom slats 4 for proper positioning of the top slats 4 (although such a system could be used to actuate side flaps 74 similar to those previously described).

Figure 15:
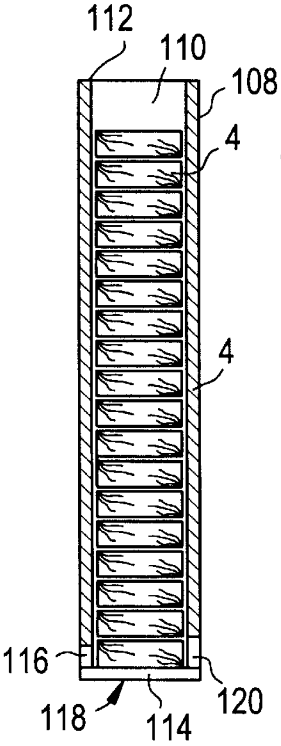
FIG. 15 is a side cross sectional view of a slat hopper.
Figure 16:
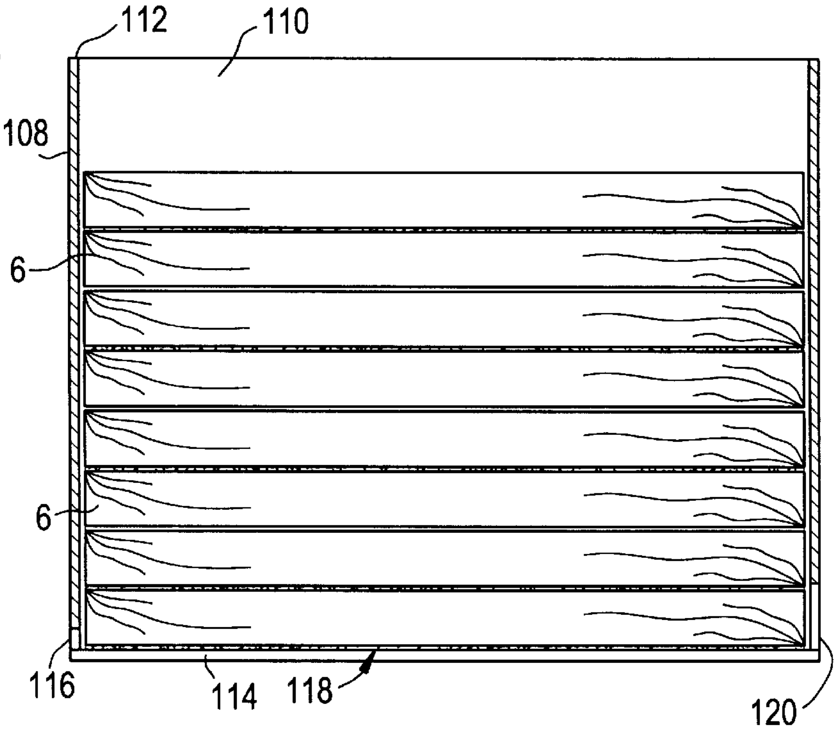
FIG. 16 is a side cross sectional view of a stringer hopper.

The first slat hopper 16 (FIG. 15), the stringer hoppers 18 (FIG. 16), and the second slat hopper 20 (FIG. 15) (the "hoppers") are positioned in the assembly path and are adapted to temporarily hold the raw materials for the pallet 2 and to dispense the materials one at a time onto the carrier 14. Structurally and operationally the hoppers are essentially the same. The hoppers hold the material stacked in a single vertical stack therein and provide an opening 112 at the top for loading material into the hopper and an exit 120 at the bottom for dispensing the material one at a time. They may attach to the floor or ground or to the frame 24 of the conveyor 12. Each hopper has a hopper body 108 defining a cavity 110 therein sized to hold a plurality of raw material (i.e. slats 4 or stringers 6 respectively) stacked therein. The cavity 110 defines the opening 112 at the top of the hopper body 108 which is sized to allow material to pass therethrough and into the cavity 110. A bottom support 114 of the hopper body 108 supports the material vertically preventing the material from falling through the bottom of the hopper. An upstream front of the hopper body 108 defines a front opening 116 adjacent the bottom that is sized to expose at least a portion of an upstream side of the bottom one of the raw material in the hopper. This front opening 116 allows a detent to abut the upstream side of the bottom slat 4 or stringer 6 and pull it from the hopper. The bottom of the hopper defines a detent passageway 118 extending the full width of hopper from the front (upstream side) to the back (downstream side). The detent passageway 118 allows the detent of the carrier 14 to remain in the actuated, up position and pass through the hopper maintaining contact with the bottom slat 4 or stringer 6 and pull the material from the hopper. Finally, the downstream back of the hopper body 108 defines a back opening 120 adjacent the bottom of the hopper body 108 that is sized to permit the bottom on of the material (slat 4 or stringer 6) to pass therethrough and from the hopper. Thereby, the detent may force the material from the hopper through the back opening 120, or exit.

Each of the hoppers is positioned in the assembly path to dispense the material in order as needed. Thus, the first slat hopper 16 is positioned at the most upstream position followed by the stringer hoppers 18 downstream from the first slat hopper 16 and the second slat hopper 20 downstream from the stringer hoppers 18. As previously mentioned, the hoppers are each positioned vertically over the conveyor 12 a predetermined distance to allow the carrier 14 to pull the material from the hopper onto the carrier 14 and the material on the carrier 14. Specifically, the first slat hopper 16 is positioned vertically to hold the bottom slat slightly higher than the upper surface of the carrier 14 so that the carrier 14 can pass under the hopper and the bottom slat detents 40 can abut the upstream side of the bottom slat and pull it from the first slat hopper 16. The stringer hoppers 18 hold the bottom stringers 6 slightly higher than the slats 4 resting on the carrier 14 allowing the carrier 14 and slats 4 to in under the stringer hopper 18 and the stringer detents 66 to pull stringers 6 from the stringer hoppers 18 onto the bottom slats 4. Likewise, the second slat hopper 20 is positioned vertically to hold the bottom one of the slats 4 therein slightly higher than the top of the stringers 6 resting on the carrier 14 so that the carrier 14, bottom slats 4, and stringers 6 can pass under the hopper and the top slat detents 72 can abut the upstream side of the bottom slat in the hopper and pull it from the second slat hopper 20. Preferably, the vertical heights of the hoppers are adjustable to provide added flexibility for the apparatus 10.

Thus, as the carrier 14 moves downstream along the assembly path, the carrier 14 pulls slats 4 and stringers 6 from the hoppers to assemble the pallet 2. The carrier 14 includes a plurality of bottom and top slat positions 84 so that the carrier 14 pulls a plurality of slats 4, one at a time (because the detents move past the slat hoppers in sequence) from each of the slat hoppers during the pallet assembly. The bottom slats 4 are aligned on the carrier 14 in substantially a single plane forming a relatively flat bottom for the pallet 2. Similarly, the top slats 4 are aligned on the stringers 6 in substantially a single plane forming a relatively flat top for the pallet 2.

As the stringers 6 are mounted in parallel to one another and are aligned lengthwise with the assembly path, the apparatus 10 preferably provides a plurality of stringer hoppers 18 mounted in parallel, side-by-side relation to one another. In this way, the carrier 14 can pull a stringer from each of the stringers 6 hoppers at the same time as the carrier 14 moves past the stringer hoppers 18. The stringers 6 are distributed from the stringer hoppers 18 in a direction lateral to, and preferably perpendicular to, the slats 4. The assembly apparatus 10 must have at least two stringer hoppers 18 to properly assemble a pallet 2, but preferably has three stringer hoppers 18 so that the apparatus 10 may assemble pallets using three stringers 6 or those requiring only two pallets.

Figure 28:
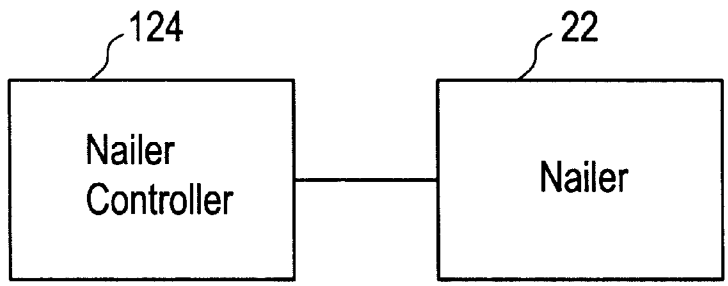
FIG. 28 is a schematic view of the nailer controller in communication with the nailer.

At least one nailer 22 is positioned in the assembly path downstream from the second slat hopper 20 and is adapted and positioned to nail the slats 4 forming the top and bottom of the pallet 2 to the stringers 6 of the pallet 2. Preferably the assembly apparatus 10 provides two nailers 22, a first nailer 22 positioned vertically over the assembly path that is positioned and adapted to nail the top slats 4 to the stringers 6 and a second nailer 22 mounted vertically under the assembly path positioned and adapted to nail the bottom slats 4 to the stringers 6. Preferably, each nailer 22 provides an automatic nail gun 122 (devices well known to those skilled in the art) associated and aligned with each of the stringer hoppers 18 so that, as an assembled pallet 2 moves to the nailer 22, an automatic nail gun 122 is aligned vertically with each of the stringers 6 to allow the slats 4 to be nailed to each of the stringers 6 simultaneously and without requiring horizontal movement of the nail gun 122. Note that manual nailing of the pallets is also possible and comprises one alternative embodiment for the nailer 22, but this manual embodiment is not preferred. When using the preferred automatic nailer 22, the apparatus 10 also preferably provides a nailer controller 124 (see FIG. 28) adapted to automatically control and actuate the nailer 22 so that manual control of the nailer 22 is not required. The nailer controller 124 actuates the nailer 22 to drive a nail into the pallet assembly when the slat and stringer requiring attachment are aligned with the nailer 22. The nailer controller 124 is essentially a switch that actuates the nailer 22 at the appropriate time. The possible types of nailer controllers 124, or proximity switches, are well known to those skilled in the relevant art and include, inter alia, mechanical switches that use a lever or detent to actuate the proximity switch, photoelectric switches that use light and/or color to actuate the proximity switch, and computer-controlled switches. For example, when using a photoelectric type switch, colored tape is attached to the side of the carrier 14 aligned with the places where nails are needed. The photoelectric switch identifies the colored tape and, in response, actuates the nailer 22 to fire nails into the pallet assembly at the desired locations.

Figure 17:
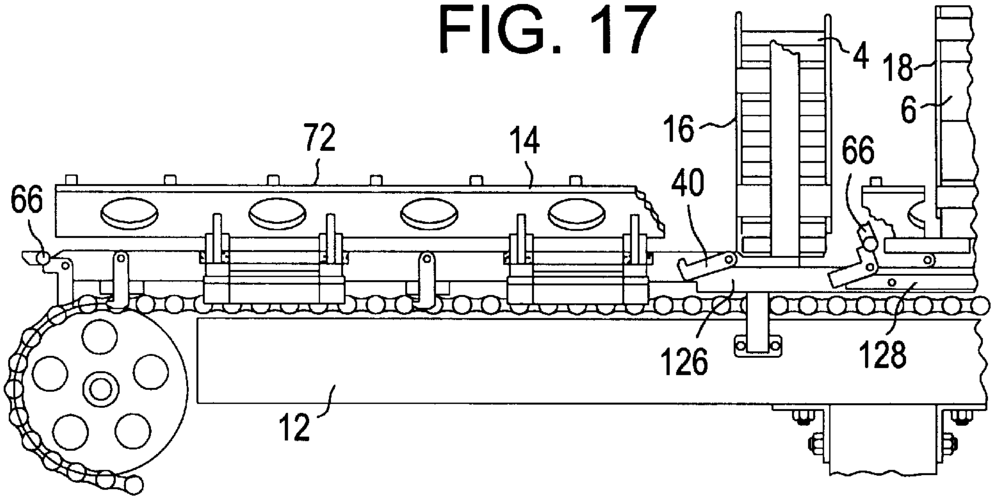
FIGS. 17 through 19 are partial side elevational views of the present invention showing the operation of the bottom slat detents pulling a slat from the first slay hopper.
Figure 18:
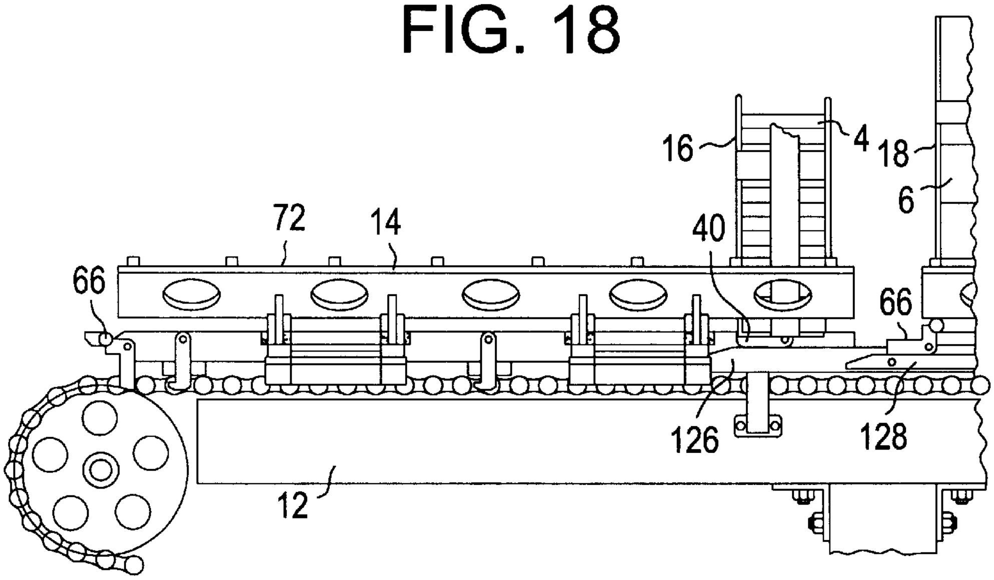
Figure 19:
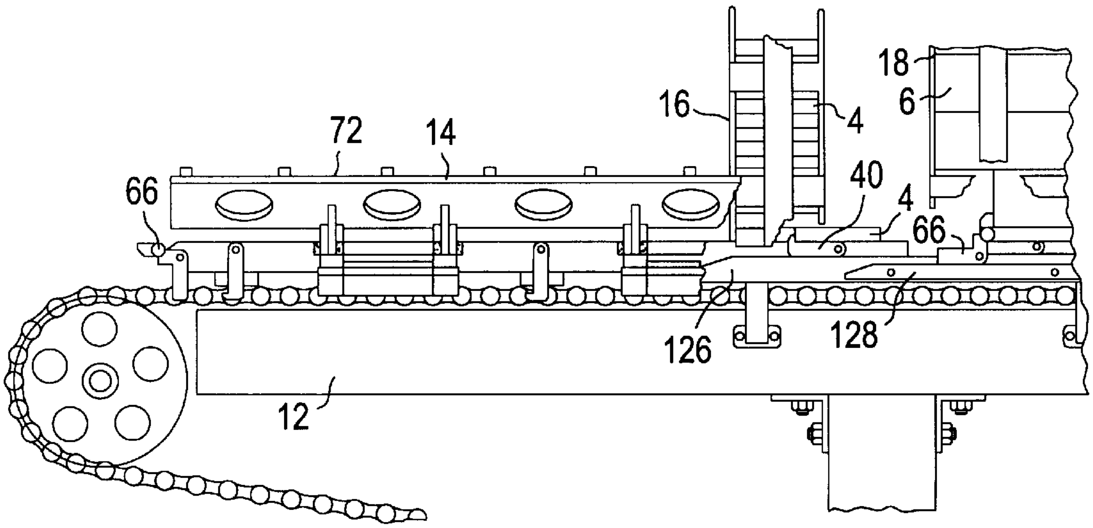

As previously discussed, the detents move between a resting position and an actuated position. Detent tracks of the assembly apparatus 10 actuate the detents. FIGS. 17 through 19 are side elevational views of a portion of the apparatus 10 showing the detent tracks associated with the bottom slat detents 40 and the top slat detents 72. The apparatus 10 provides a bottom slat detent track 126 that is preferably attached to the conveyor 12 (particularly the conveyor frame 24) and that extends parallel to and beside the assembly path. The bottom slat detent tracks 126 are aligned laterally with the bottom slat detents 40 on the carriers 14 and are positioned to abut the bottom slat detents 40 as the carrier 14 moves past the bottom slat detent tracks 126. For an apparatus 10 in which the carrier 14 has bottom slat detents 40 on each side of the carrier 14, the apparatus 10 has a bottom slat detent track 126 on each side of the conveyor 12. The upper surface of the bottom slat detent track 126 is substantially smooth to allow the bottom slat detents 40 to easily slide over the upper surface. For proper assembly of the pallet 2, the bottom slat detent tracks 126 extend from a position upstream from the first slat hopper 16 to a position at (even with) or beyond the nailer 22. Thus, the bottom slat detent tracks 126 move the bottom slat detents 40 to the actuated position before the carrier 14 reaches the first slat hopper 16 and holds the slats 4 forming the bottom of the pallet 2 in position until after the pallet 2 is nailed together by the nailer 22. The bottom slat detent tracks 126 terminate at a position at or downstream from the nailer 22 and before the pallet 2 is removed from the carrier 14. Once the bottom slat detents 40 move off of the bottom slat detent tracks 126, the bottom slat detents 40 rotate to the resting position under force of gravity allowing the assembled pallet 2 to be removed from the carrier 14 without interference from the bottom slat detents 40.

The apparatus 10 also provides stringer detent tracks 128 mounted in parallel to the bottom slat detent tracks 126, preferably attached to the conveyor 12. Like the bottom slat detent tracks 126, the stringer detent tracks 128 are adapted to move the stringer detents 66 from the resting position to the actuated position and to maintain the stringer detent 66 in the actuated position from between the first slat hopper 16 and the stringer hopper 18 to a position at or downstream from the nailer 22. The structure of the stringer detent track 128 is essentially the same as the bottom slat detent track 126 in that it has a substantially flat upper surface, is mounted parallel to the assembly path, and is positioned in alignment with the stringer detents 66 attached to the carrier 14 so that it will actuate the stringer detents 66. In one preferred embodiment shown in the figures, the stringer detent tracks 128 are mounted offset from and just outside the bottom slat detent tracks 126. The offset mounting allows the tracks to engage the respective detents only. The stringer detent track 128 extends from a position downstream from the first slat hopper 16 and upstream to the stringer hopper 18 to a position even with or downstream from the nailer 22 at which point the stringer detent track 128 terminates allowing the stringer detents 66 to move to the resting position under force of gravity and facilitate removal of the assembled pallet 2.

Figure 20:
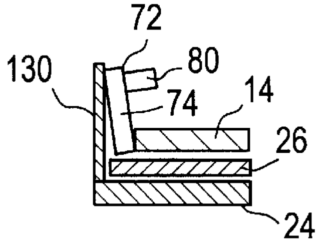
FIG. 20 is a partial cross sectional view showing the first top slat detent track.
Figure 21:
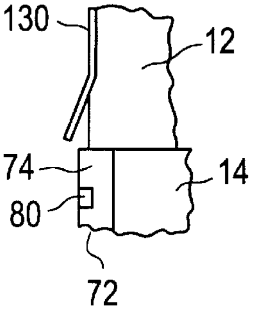
FIG. 21 is a partial top view of the first top slat detent track.

Further, the assembly apparatus 10 provides a set of top slat detent 72 tracks to move the top slat detents 72 between the resting and actuated positions. A first top slat detent track 130 (shown in FIGS. 20 and 21) is provided parallel to the assembly path and preferably attached to the conveyor 12. The first top slat detent track 130 extends upward adjacent the sides 38 of the carriers 14 in close proximity thereto and above the upper surface 32 of the base 30. The first top slat detent tracks 130 preferably extend vertically upward although they may extend upward at an angle thereto. An initial portion (the most upstream portion) of the first top slat detent tracks 130 are angle slightly away from the carriers 14 to provide for a smooth transition; and the inner surface of the first top slat detent tracks 130 is substantially smooth to allow easy sliding of the side flaps 74 against the inner surfaces. The first top slat detent tracks 130 are positioned so that, as a carrier 14 moves adjacent the first top slat detent tracks 130, the side flaps 74 abut the first top slat detent tracks 130 and force them inward to the actuated position. The first top slat detent tracks 130 extend from a position downstream from the stringer hopper 18 and upstream from the second slat hopper 20 to a position at or downstream from the nailer 22. However, the first top slat detent tracks 130 release the side flaps 74 to the resting position at a position at or downstream from the nailer 22. Typically, the side flaps 74 will fall to the resting position under action of gravity once released.

Figure 22:
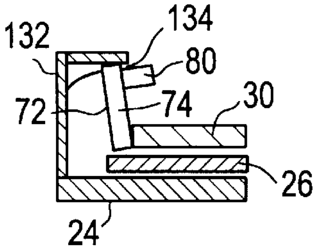
FIG. 22 is a partial cross sectional view showing the second top slat detent track.
Figure 23:
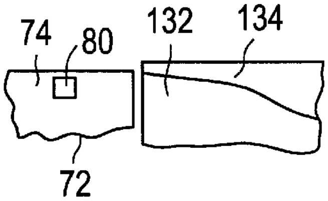
FIG. 23 is a partial side showing the second top slat detent track.

However, to ensure that the side flaps 74 move to the resting position before the assembled pallet 2 is removed from the carrier 14, the apparatus 10 preferably also provides a second top slat detent track 132 positioned downstream from the first top slat detent track 130. The second top slat detent tracks 132 (FIGS. 22 and 23) are adapted to move the side flaps 74 from the actuated position to the resting position. In the embodiment shown, the second top slat detent tracks 132 provide an outer lip 134 mounted to a frame. The outer lip 134 extends over the side flaps 74 and are positioned to abut a front side of the side flaps 74 near their top ends. The lip 134 is angled outward and downward in the downstream direction to pull the side flaps 74 down and away from the center of the carrier 14. The second top slat detent tracks 132 may be especially important for side flaps 74 which incorporate biasing springs (such as compression springs) positioned and adapted to maintain the side flaps 74 in either the resting position or the actuated position.

Note that the above description of the detent tracks refers to one preferred embodiment of the assembly apparatus 10 and that other equally effective embodiments may be used. For example, the lateral of positioning of the tracks may be changed without affecting the essential operation of the detents and detent tracks. Additionally, for embodiments using, for example, solenoids 58 as the detents, the detent track may comprise electrical contact strips to activate the solenoids 58.

So that the assembly apparatus 10 may continuously make pallets, the apparatus 10 preferably provides a plurality of carriers 14 mounted to the conveyor 12 as shown in FIG. 1.

In operation, the conveyor belt 26 rotates about the conveyor frame 24 moving the attached carriers 14 in a downstream direction along the assembly path. FIGS. 17 through 19 show the carrier 14 moving past the first slat hopper 16 and pulling a slat therefrom. As the carrier 14 approaches the first slat hopper 16, the bottom slat detent track 126 moves the first bottom slat detent 40 from the resting position to the actuated position where the catch 48 extends above the upper surface 32 of the base 30 of the carrier 14. The bottom slat detent 40 moves past the first slat hopper 16 and pulls a slat therefrom. The carrier 14 continues moving downstream with the other bottom slat detents 40 attached to the carrier 14 pulling additional slats 4 onto the carrier 14 and forming the bottom of the pallet 2.

Figure 24:
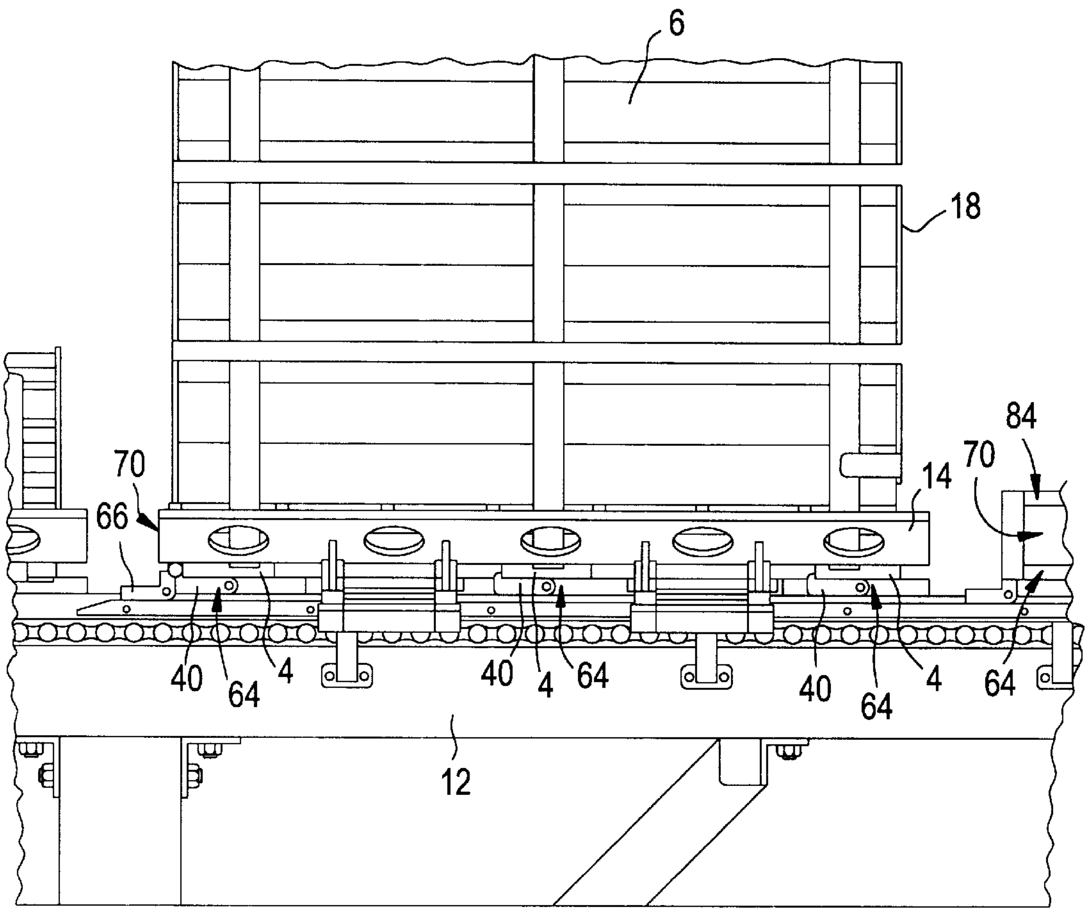
FIG. 24 is a partial side elevational view of the present invention.

As the carrier 14 approaches the stringer hopper 18, the stringer detent tracks 128 move the stringer detents 66 from the resting position to the actuated position where the stringer detents 66 extend above the slats 4 resting on the carrier 14. The stringer detents 66 then pull stringers 6 from the stringer hoppers 18 onto the bottom of the pallet 2 as the carrier 14 passes the stringer hoppers 18 (FIG. 24).

Figure 25:
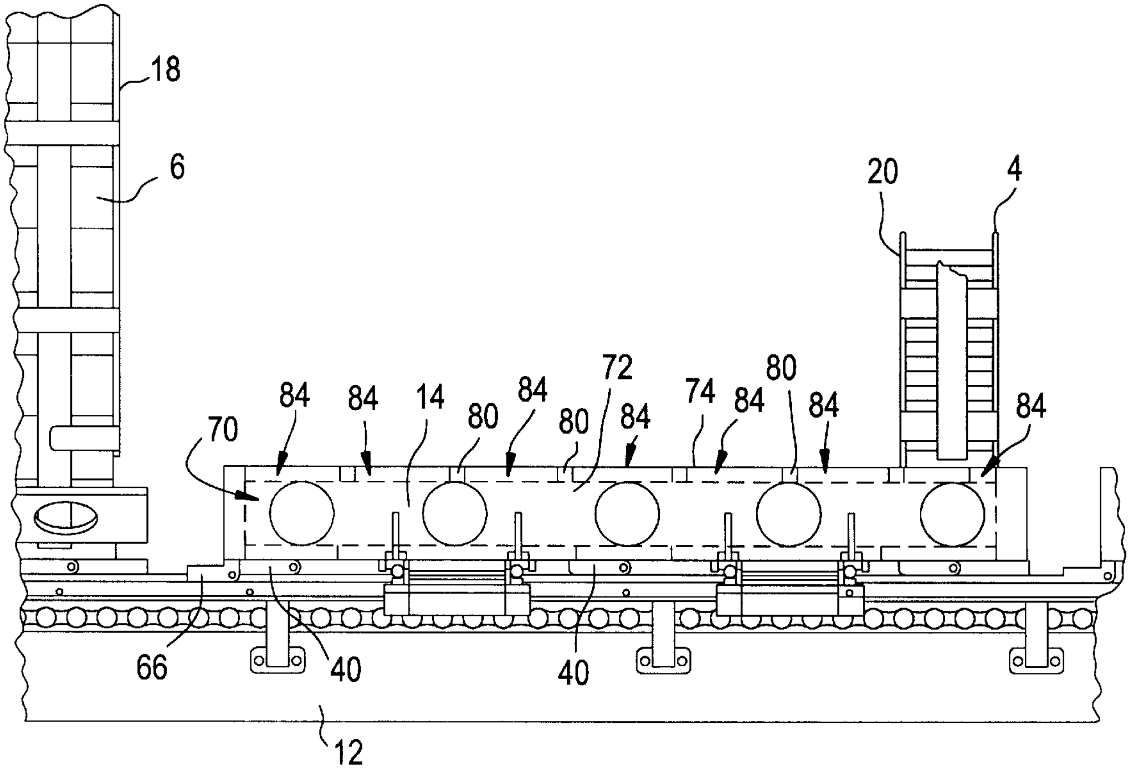
FIG. 25 is a partial side elevational view of the present invention.

Moving downstream past the stringer hopper 18 the carrier 14 moves between the first top slat detent tracks 130 which force the side flaps 74 from the resting position to the actuated position (FIG. 25). The top slat detents 72 pull top slats 4 from the second slat hopper 20 as the carrier 14 moves further downstream passing the second slat hopper 20.

Figure 26:
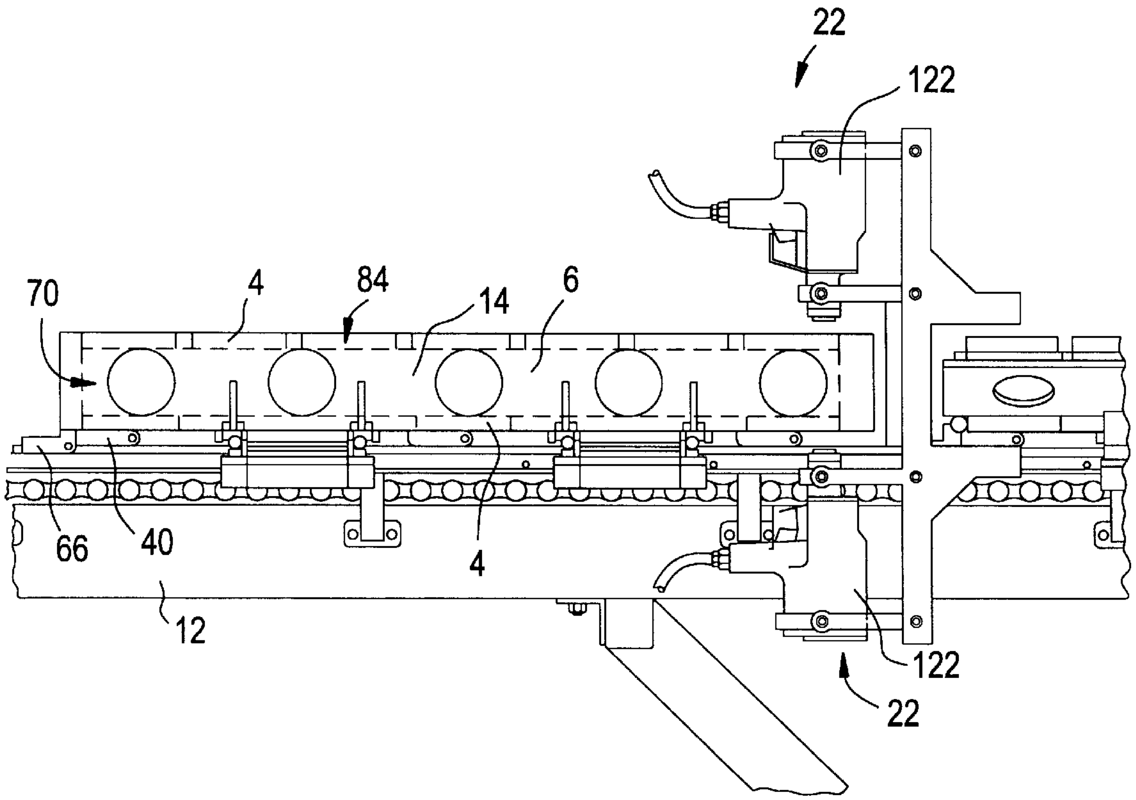
FIG. 26 is a partial side elevational view of the present invention.

Then, the carrier 14 moves the pallet 2 assembly to the nailers 22 (FIG. 26) where the pallet 2 is nailed together.

Finally, the conveyor 12 moves the carrier 14 downstream from the nailer 22(s) where the detent tracks release the detents to the resting position (and the second top slat detent tracks 132 force the top slat detents 72 to the resting position) so that all of the detents are removed from the assembled pallet 2. The pallet 2 is then removed from the carrier 14.

Figure 27:
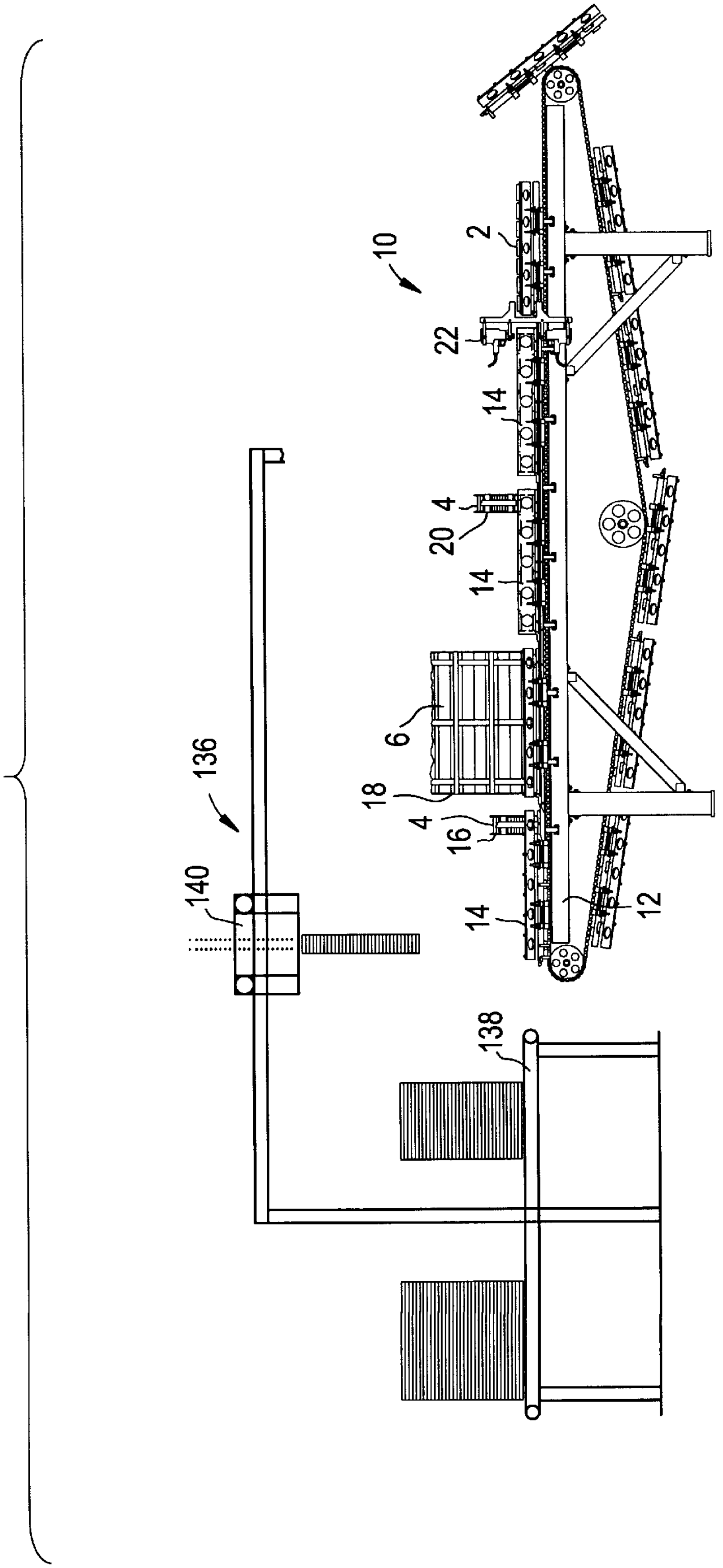
FIG. 27 is a side elevational view of the present invention showing the automatic material loader.
Figure 29:
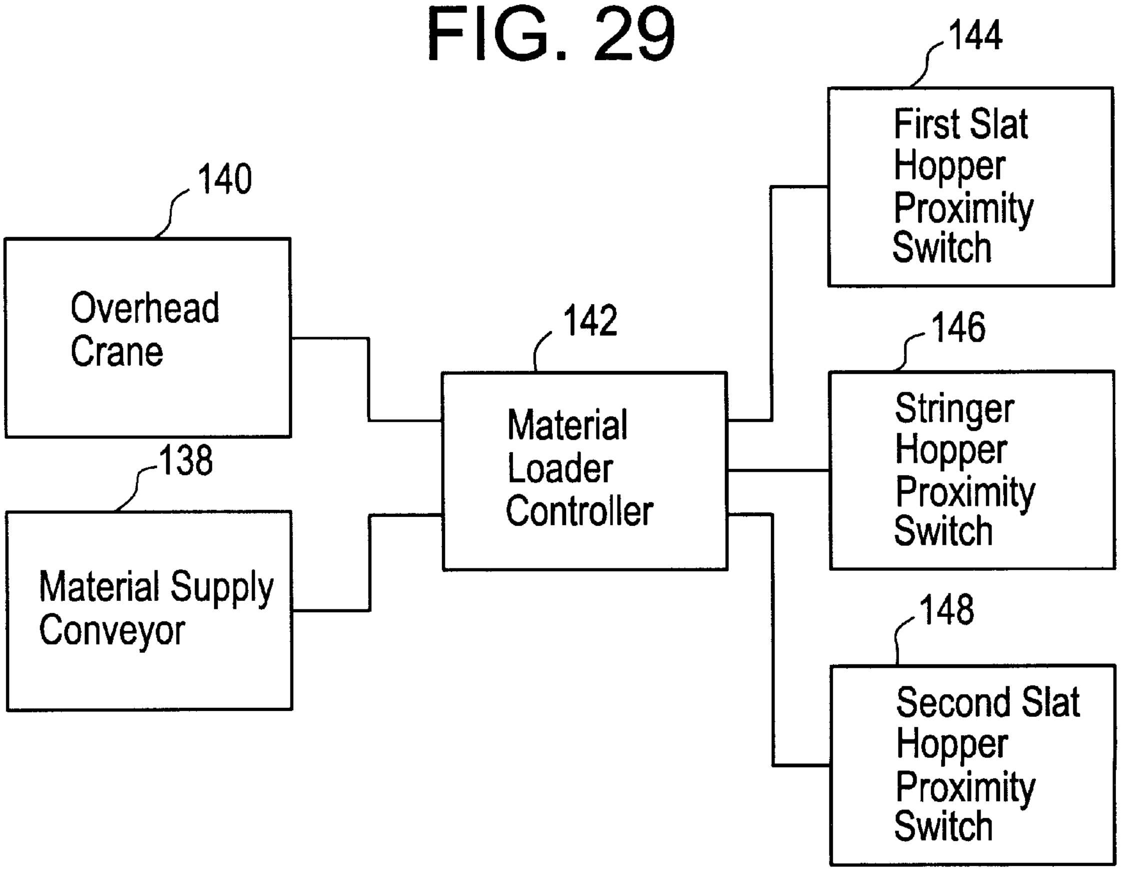
FIG. 29 is a schematic view of one embodiment of the automatic material loader.

One alternative embodiment of the assembly apparatus 10, shown in FIG. 27 and 29, also provides an automatic material loader 136 that is adapted to move raw material from a material supply to refill the hoppers. In one preferred embodiment, the material loader 136 provides a material supply conveyor 138 positioned proximal the conveyor 12 and having a supply of material thereon; an overhead crane 140 movable between the conveyor 12 (specifically the hoppers) and the material supply conveyor 140 is adapted to retrieve a stack of material from the material supply conveyor 138 and place the material in the desired hopper; and a proximity switch, 144, 146, and 148, attached to each of the hoppers detects the level of material therein. The material supply conveyor 138, the crane 140, and the proximity switches, 144, 146, and 148, communicate with a material loader controller 142 which controls the position and operation of the crane 140 and the material supply conveyor 138 in response to feedback from the proximity switches, 144, 146, and 148. Thus, the automatic material loader 136 maintains the material in the hoppers.

Figure 30:
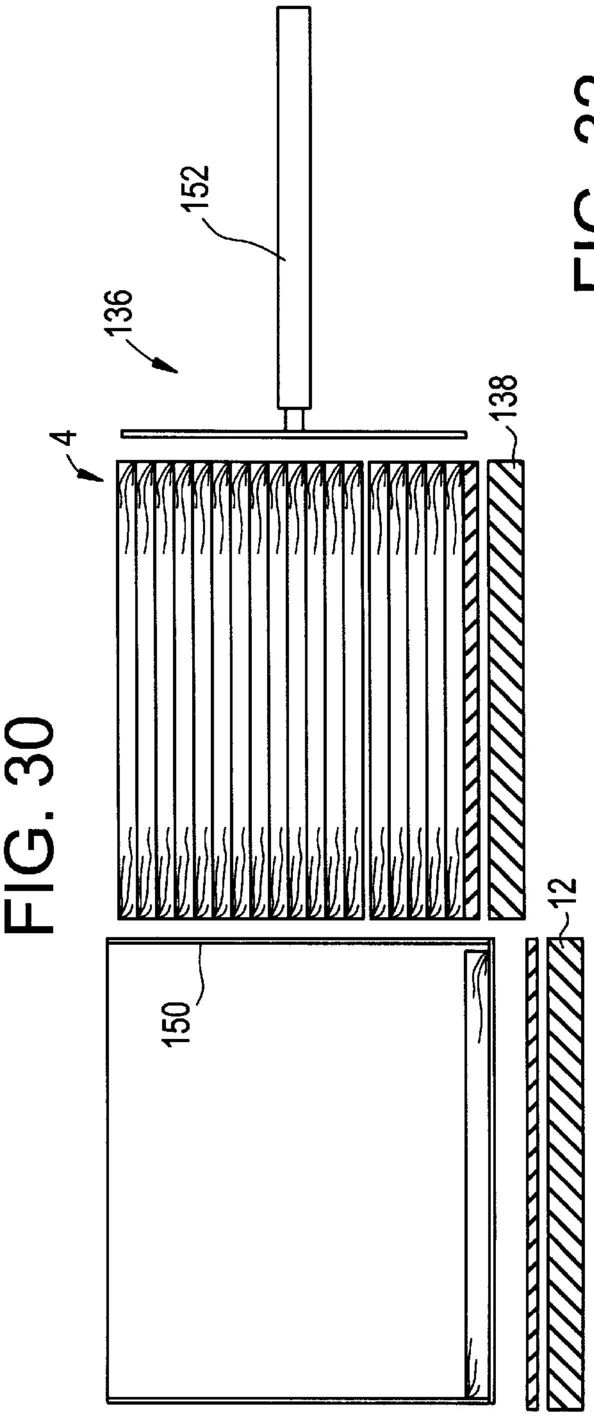
FIG. 30 is a partial side elevational view of another embodiment for the automatic material loader.
Figure 31:
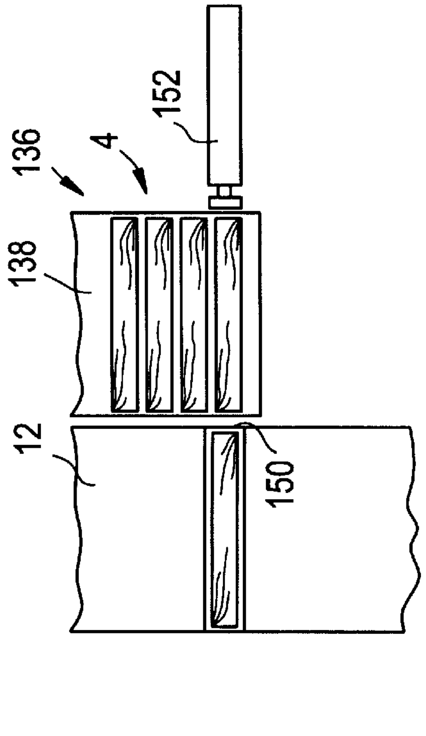
FIG. 31 is a partial top elevational view of the embodiment for the automatic material loader shown in FIG. 30.
Figure 32:
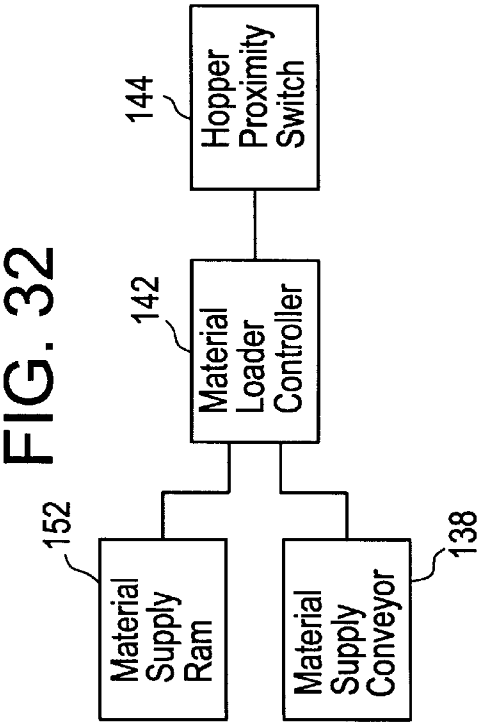
FIG. 32 is a schematic view of the embodiment of the automatic material loader shown in FIGS. 30 and 31.

FIGS. 30 through 32 are side, top, and schematic views respectively of a preferred alternative embodiment for the automatic material loader 136. In this embodiment, the material loader 136 provides a material supply conveyor 138 extending parallel to and along-side the conveyor 12. The upper surface of the material supply conveyor 138 is higher than the vertical height of the upper surface of the conveyor 12 and is positioned to hold the stack of material at the appropriate height for insertion into the material hopper. The material hoppers define side loading openings 150 in the side of the material hopper nearest the material supply conveyor 138. The side loading opening 150 is sized and adapted to allow a stack of material to pass therethrough into the hopper. A material stack ram 152 of the material loader 136 is positioned on a side of the material supply conveyor 138 that is opposite the conveyor and is aligned with the side loading opening 150 of the hopper. The material stack ram 152 is adapted and positioned to push an aligned stack of material from the material supply conveyor 138 through the side loading opening 150 and into the associated material hopper. For example, the material stack ram 152 may comprise a hydraulic or pneumatic cylinder or an air operated motor on a gear track conveyor. A material loader controller 142 controls the motion of the conveyor to align the material stacks with the material stack ram 152 and the side loading opening 150 and controls the material stack ram 152 in response to proximity switches attached to the material hoppers.

While the foregoing is directed to the preferred embodiment of the present invention, other and further embodiments of the invention may be devised without departing from the basic scope thereof, and the scope thereof is determined by the claims which follow.

I claim:

1. An automatic pallet making apparatus for assembling pallets from slats and stringers, the apparatus comprising:

a conveyor;

at least one carrier attached to the conveyor, the at least one carrier having a base having a substantially flat upper surface, a front, a back, and opposing sides;

a plurality of bottom slat detents attached to the base, the plurality of bottom slat detents spaced between the front and the back of the base;

the plurality of bottom slat detents selectively extending above the upper surface of the base;

at least one stringer detent attached to the base proximal the back of the base;

the at least one stringer detent selectively extending above the upper surface of the base in the vertical direction a distance that is at least slightly greater than the thickness of the slats;

a plurality of top slat detents attached to the base, the plurality of top slat detents spaced between the front and the back of the base;

the plurality of top slat detents selectively extending above the upper surface of the base in the vertical direction a distance that is at least slightly greater than the thickness of the slats and the stringers;

at least two side flaps having a pivot end and an apogee end, the pivot end pivotally mounted to the base;

the at least two side flaps pivotable between a resting position and an actuated position;

the apogee end of the at least two side flaps each defining at least one catch;

the at least one catch is positioned and adapted to extend over the upper surface of the base when the at least two side flaps are in the actuated position;

the at least one catch defining a forward abutment surface adapted and positioned to abut a side of a top slat;

the conveyor adapted to move the at least one carrier along an assembly path in a downstream direction;

a first slat hopper positioned in the assembly path, the first slat hopper adapted to hold a plurality of slats therein;

the at least one carrier is adapted to pull a predetermined number of slats sequentially from the first slat hopper, one at a time, as the at least one carrier moves downstream along the assembly path past the first slat hopper;

the at least one carrier is adapted to align the slats pulled from the first slat hopper onto the at least one carrier substantially in a single plane and with the slats defining a bottom of the pallet;

at least two stringer hoppers positioned in the assembly path downstream from the first slat hopper, the at least two stringer hoppers each adapted to hold a plurality of stringers therein;

the at least two stringer hoppers oriented substantially parallel to one another with the stringers aligned transversely to the slats in the first slat hopper and transversely to the slats forming the bottom of the pallet;

the at least one carrier is adapted to pull one of the stringers from each of the at least two stringer hoppers onto the bottom of the pallet as the at least one carrier moves downstream along the assembly path past the stringer hopper with the stringers pulled from the at least two stringer hoppers oriented transversely to the slats of the bottom in spaced, substantially parallel relation to one another;

a second slat hopper positioned in the assembly path downstream from the at least two stringer hoppers, the second slat hopper adapted to hold a plurality of slats therein;

the at least one carrier is adapted to pull a predetermined number of slats sequentially from the second slat hopper, one at a time, onto the previously pulled stringers as the at least one carrier moves downstream along the assembly path past the second slat hopper;

the second slat hopper oriented substantially parallel to the first slat hopper with the slats held in the first and second slat hoppers substantially parallel to one another and transversely oriented to the stringers in the stringer hopper;

the at least one carrier is adapted to align the slats pulled from the second slat hopper onto the stringers substantially in a single plane and defining a top of the pallet with the slats forming the top oriented transversely to the stringers and substantially parallel to the slats forming the bottom of the pallet;

at least one nailer positioned in the assembly path downstream from the second slat hopper;

the at least one nailer adapted and positioned to nail the slats forming the top and bottom of the pallet to the stringers of the pallet.

2. The apparatus of claim 1, wherein the conveyor comprises:

a conveyor frame;

an endless conveyor belt movably attached to the conveyor frame; and a drive motor attached to and adapted to move the endless conveyor belt.

3. The apparatus of claim 2, wherein the endless conveyor belt comprises a chain.

4. The apparatus of claim 2, wherein the endless conveyor belt comprises a belt.

5. The apparatus of claim 1, further comprising:

a bottom slat detent track attached to the conveyor, the bottom slat detent track is adapted to move the plurality of bottom slat detents from the resting position to the actuated position and maintain the plurality of bottom slat detents in the actuated position from a position upstream from the first slat hopper to a position at or downstream from the at least one nailer; and the bottom slat detent track is adapted to release the plurality of bottom slat detents from the actuated position to the resting position at or downstream from the at least one nailer.

6. The apparatus of claim 1, further comprising:

a stringer detent track attached to the conveyor, the stringer detent track is adapted to move the at least one stringer detent from the resting position to the actuated position and maintain the at least one stringer detent in the actuated position from a position between the first slat hopper and the stringer hopper to a position at or downstream from the at least one nailer; and the bottom slat detent track is adapted to release the at least one stringer detent from the actuated position to the resting position at or downstream from the at least one nailer.

7. The apparatus of claim 1, further comprising:

a first top slat detent track attached to the conveyor, the first top slat detent track is adapted to move the plurality of top slat detents from the resting position to the actuated position and maintain the plurality of top slat detents in the actuated position from a position between the stringer hopper and the second slat hopper to a position at or downstream from the at least one nailer; and the first top slat detent track is adapted to release the plurality of first top slat detents from the actuated position to the resting position at or downstream from the at least one nailer.

8. The apparatus of claim 7, further comprising:

a second top slat detent track attached to the conveyor, the second top slat detent track is adapted to move the plurality of top slat detents from the actuated position to the resting position at or downstream from the at least one nailer.

9. The apparatus of claim 1, wherein the at least one carrier is removably attached to the conveyor.

10. The apparatus of claim 1, wherein the first slat hopper comprises:

a hopper body defining a cavity therein, a top, a bottom, an upstream front, a downstream back, and opposing sides;

the cavity defining an opening at the top of the hopper body;

the cavity sized to hold a plurality of stacked slats therein;

a bottom support of the hopper body adapted to support the plurality of stacked slats vertically;

the bottom of the hopper body defining a detent passageway extending the full width from the front to the back of the hopper body;

the front of the hopper body defining a front opening adjacent the bottom of the hopper body, the front opening exposing at least a portion of the upstream side of the bottom one of the plurality of stacked slats held in the hopper body; and the back of the hopper body defining a back opening adjacent the bottom of the hopper body, the back opening sized and adapted to permit the bottom one of the plurality of stacked slats held in the hopper body to exit therethrough.

11. The apparatus of claim 10, wherein the bottom of the hopper body is spaced above the conveyor at least slightly more than an upper surface of the carrier.

12. The apparatus of claim 1, wherein each of the at least two stringer hoppers comprises:

a hopper body defining a cavity therein, a top, a bottom, an upstream front, a downstream back, and opposing sides;

the cavity defining an opening at the top of the hopper body;

the cavity sized to hold a plurality of stacked stringers therein;

a bottom support of the hopper body adapted to support the plurality of stacked stringers vertically;

the bottom of the hopper body defining a detent passageway extending the full width from the front to the back of the hopper body;

the front of the hopper body defining a front opening adjacent the bottom of the hopper body, the front opening exposing at least a portion of the upstream side of the bottom one of the plurality of stacked stringers held in the hopper body; and the back of the hopper body defining a back opening adjacent the bottom of the hopper body, the back opening sized and adapted to permit the bottom one of the plurality of stacked stringers held in the hopper body to exit therethrough.

13. The apparatus of claim 12, wherein the bottom of the hopper body is spaced above the conveyor at least slightly more than a top of a bottom slat resting on an upper surface of the carrier.

14. The apparatus of claim 1, wherein at least two stringer hoppers are mounted side-by-side and are adapted to dispense stringers at substantially the same time.

15. The apparatus of claim 1, comprising three stringer hoppers.

16. The apparatus of claim 1, wherein the at least two stringer hoppers are adapted and oriented to distribute stringers substantially perpendicular to the slats forming the bottom of the pallet.

17. The apparatus of claim 1, wherein the second slat hopper comprises:

a hopper body defining a cavity therein, a top, a bottom, an upstream front, a downstream back, and opposing sides;

the cavity defining an opening at the top of the hopper body;

the cavity sized to hold a plurality of stacked slats therein;

a bottom support of the hopper body adapted to support the plurality of stacked slats vertically;

the bottom of the hopper body defining a detent passageway extending the full width from the front to the back of the hopper body;

the front of the hopper body defining a front opening adjacent the bottom of the hopper body, the front opening exposing at least a portion of the upstream side of the bottom one of the plurality of stacked slats held in the hopper body; and the back of the hopper body defining a back opening adjacent the bottom of the hopper body, the back opening sized and adapted to permit the bottom one of the plurality of stacked slats held in the hopper body to exit therethrough.

18. The apparatus of claim 17, wherein the bottom of the hopper body is spaced above the conveyor at least slightly more than a top of a stringer resting on a bottom slat resting on an upper surface of the carrier.

19. The apparatus of claim 1, wherein the at least one nailer comprises an automatic nail gun associated and aligned with each of the stringer hoppers.

20. The apparatus of claim 19, comprising:

a first nailer mounted vertically over the assembly path positioned and adapted to nail the top slats to the stringers; and a second nailer mounted vertically under the assembly path positioned and adapted to nail the bottom slats to the stringers.

21. The apparatus of claim 1, further comprising a nailer controller adapted to actuate the nailer.

22. The apparatus of claim 21, wherein the nailer controller comprises at least one mechanical switch.

23. The apparatus of claim 21, wherein the nailer controller comprises at least one photoelectric switch.

24. The apparatus of claim 21, wherein the nailer controller comprises at least one computer controlled switch.

* * * * *